United States Patent
Hikida

(10) Patent No.: US 8,576,327 B2
(45) Date of Patent: Nov. 5, 2013

(54) FOCUS BRACKET PHOTOGRAPHING IMAGING APPARATUS, REPRODUCTION DISPLAY APPARATUS, IMAGE RECORDING METHOD, AND REPRODUCTION DISPLAYING METHOD

(75) Inventor: Satoshi Hikida, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 291 days.

(21) Appl. No.: 13/202,145

(22) PCT Filed: Mar. 2, 2010

(86) PCT No.: PCT/JP2010/053720
§ 371 (c)(1),
(2), (4) Date: Aug. 18, 2011

(87) PCT Pub. No.: WO2010/101269
PCT Pub. Date: Sep. 10, 2010

(65) Prior Publication Data
US 2011/0298964 A1    Dec. 8, 2011

(30) Foreign Application Priority Data
Mar. 3, 2009    (JP) ................. 2009-049991

(51) Int. Cl.
*H04N 5/232* (2006.01)

(52) U.S. Cl.
USPC ....................................... 348/345

(58) Field of Classification Search
USPC .......................... 348/345, 356, 349
See application file for complete search history.

(56) References Cited

U.S. PATENT DOCUMENTS

| | | | |
|---|---|---|---|
| 6,614,998 B1 * | 9/2003 | Senba et al. | 396/123 |
| 7,565,071 B2 * | 7/2009 | Lin et al. | 396/121 |
| 8,106,995 B2 * | 1/2012 | Tamaru | 348/345 |
| 8,111,321 B2 * | 2/2012 | Yoshida | 348/345 |
| 8,160,378 B2 * | 4/2012 | Hikida | 382/255 |
| 2003/0169363 A1 | 9/2003 | Ogino | |
| 2006/0061678 A1 | 3/2006 | Yamazaki | |
| 2009/0196522 A1 | 8/2009 | Hikida | |
| 2010/0027906 A1 | 2/2010 | Hara et al. | |

FOREIGN PATENT DOCUMENTS

| | | |
|---|---|---|
| JP | 2001-119623 A | 4/2001 |
| JP | 2002-084440 | 3/2002 |
| JP | 2002-277725 A | 9/2002 |
| JP | 2003-333411 A | 11/2003 |
| JP | 2004-135029 A | 4/2004 |
| JP | 2004-289214 A | 10/2004 |
| JP | 2006-86952 A | 3/2006 |

(Continued)

Primary Examiner — Gary C Vieaux
(74) Attorney, Agent, or Firm — Dickstein Shapiro LLP

(57) ABSTRACT

An imaging apparatus includes an imaging optical system, an image pickup device, a photographing position determining device configured to determine a plurality of photographing positions to continuously photograph a subject, and an image data dividing device configured to divide image data obtained by the image pickup device into a plurality of large sections and to divide the image data into a plurality of small sections each being smaller than the large section. The photographing position determining device configured to determine one or more reference positions as the photographing positions based on focused information of the large sections, and when a number of the photographing positions determined based on the large sections is less than a predetermined number, to additionally determine the photographing position based on focused state information of the small sections such that the predetermined number of the determined photographing positions is obtained.

18 Claims, 10 Drawing Sheets

(56) References Cited

FOREIGN PATENT DOCUMENTS

| JP | 2006-254272 A | 9/2006 |
|----|---------------|--------|
| JP | 2006-311340 A | 11/2006 |
| JP | 2007-334242 A | 12/2007 |
| JP | 2009-188490 A | 8/2009 |
| JP | 2010-20081 A | 1/2010 |
| JP | 2010-122515 A | 6/2010 |

* cited by examiner

| REFERENCE POSITION | $L_0$ | $L_1$ | $L_2$ | $L_3$ | $L_4$ | $L_5$ | $L_6$ | $L_7$ | $L_8$ | $L_9$ | $L_\infty$ |
|---|---|---|---|---|---|---|---|---|---|---|---|
| PEAK FREQUENCY | 0 | 1 | 2 | 1 | 0 | 0 | 0 | 0 | 0 | 1 | 3 |

PREPARE HISTOGRAM FROM PEAK POSITIONS OF SECTIONS

↓ DETERMINED POSITION FROM PREDETERMINED INTERVAL
● PHOTOGRAPHING POSITION DETERMINED FROM HISTOGRAM

FOCUS BRACKET PHOTOGRAPHING IMAGING APPARATUS, REPRODUCTION DISPLAY APPARATUS, IMAGE RECORDING METHOD, AND REPRODUCTION DISPLAYING METHOD

TECHNICAL FIELD

The present invention relates to an imaging apparatus such as a digital camera having an imaging optical system having a focus adjustment mechanism, and a solid-state image pickup device configured to convert a subject image imaged by the imaging optical system into an electrical signal as image data, more specifically, to an imaging apparatus configured to continuously obtain a plurality of photographic images by sequentially photographing a subject at a plurality of photographing positions having different focal length or focusing positions, a reproduction displaying apparatus configured to display the images obtained in such a way, an image recording method for continuously obtaining a plurality of photographed images by photographing a subject at a plurality of focusing positions and a reproduction displaying method for displaying the stored photographed images.

BACKGROUND ART

When photographing a subject having a large depth by an imaging apparatus such as a digital camera, or the like, so-called erroneous focusing, that is, focusing on a not-desired position occurs due to a performance limit of algorithm, hardware, or the like so that photographing a desired part of the subject in a focused state is difficult, as a result. In this case, in order to overcome the erroneous focusing problem, focus bracket photographing for continuously photographing a subject while sequentially changing the focusing position to obtain a plurality of photographed images at once is used. The focus bracket photographing is, in general, performed by changing the focusing position forward and backward to photograph about three times and therefore it is difficult to overcome the erroneous focusing problem.

Furthermore, it has been required by photographers, who do not decide which subject is to be focused, to select the best one from a plurality of photographed images obtained by changing the photographing positions after comparing and investigating the plurality of photographed images. For example, when photographing, for example, a flower under optical conditions in a telemacro mode of a small depth of field, in some cases, it cannot be decided before photographing whether focusing on a petal of the flower at a near side or a pistil or stamen of the flower and therefore favorable one to photograph a favorable one.

For example, Japanese Patent Application Publication No. 2004-135029 discloses a camera performing a focus bracket photographing by changing the focusing position at one operation of pushing down a release button.

Japanese Patent Application Publication No. 2002-277725 does not disclose the focus bracket photographing but discloses focus control process including dividing an image into a plurality of blocks, controlling exposure in each block such that brightness in each block is in a predetermined level, generating focus evaluation value of each block, and then generating new focus evaluation value based on the focus evaluation values of the blocks within a predetermined focus range.

However, in the conventional focus bracket photographing, there are the following problems:

(1) an unnecessary image where no subject is focused on within the image is photographed; and
(2) it is difficult for a user to confirm which part within each of the plurality of photographed images is focused on.

SUMMARY OF INVENTION

An object of the present invention is to provide an imaging apparatus, a reproduction displaying apparatus, an image recording method and a reproduction displaying method, capable of effectively reducing unnecessary photographing of images when continuously photographing a plurality of images sequentially at a plurality of photographing positions and easily confirming the focused part in the photographed image.

To achieve the above object, an imaging apparatus according to an embodiment of the present invention includes an imaging optical system configured to image a subject image, a solid-state image pickup device configured to convert the subject image imaged by the imaging optical system into an electrical signal and output the electrical signal as image data, a photographing position determining device configured to determine a plurality of photographing positions having different focal positions of the imaging optical system to continuously photograph a subject, a continuously-photographing processing device configured to obtain a plurality of photographed images by continuously photographing the subject through the solid-state image pickup device at the plurality of photographing positions determined by the photographing position determining device, an image data dividing device configured to divide the image data into a plurality of sections, a section focus information obtaining device configured to obtain section focus information about a focused state of each of the plurality of sections at a plurality of reference positions, a section focusing position calculating device configured to calculate a focusing position in which each of the plurality of sections is in the focused state based on the section focus information obtained by the section focus information obtaining device, and a focusing position distribution information obtaining device configured to calculate a number of focused sections each being in the focused state at each reference position based on the focusing positions of the plurality of sections calculated by the section focusing position calculating device and obtain focusing position distribution information. The image data dividing device includes a large section dividing device configured to divide the image data into a first predetermined number of large sections each having a first predetermined size, and a small section dividing device configured to divide the image data into a second predetermined number of small sections each having a second predetermined size smaller than the first predetermined size, the second predetermined number being larger than the first predetermined number. The photographing position determining device includes a device configured to determine one or more reference positions different from each other as the photographing positions based on the focusing position distribution information of the large sections obtained by the focusing position distribution information obtaining device for the plurality of large sections, and when a number of the photographing positions determined based on the focusing position distribution information of the large sections is less than a predetermined number of the photographing positions, to additionally determine the reference position as the photographing position based on the focusing position distribution information of the small sections obtained by the focusing position distribution information obtaining device for the plurality of small sections such that the predetermined number of the determined photographing positions different from each other is obtained.

MODE FOR CARRYING OUT THE INVENTION

Preferred embodiments of an imaging apparatus, a reproduction displaying apparatus, an image recording method, and a reproduction displaying method according to the present invention will be explained in detail hereinafter with reference to the accompanying drawings.

Figure 1:
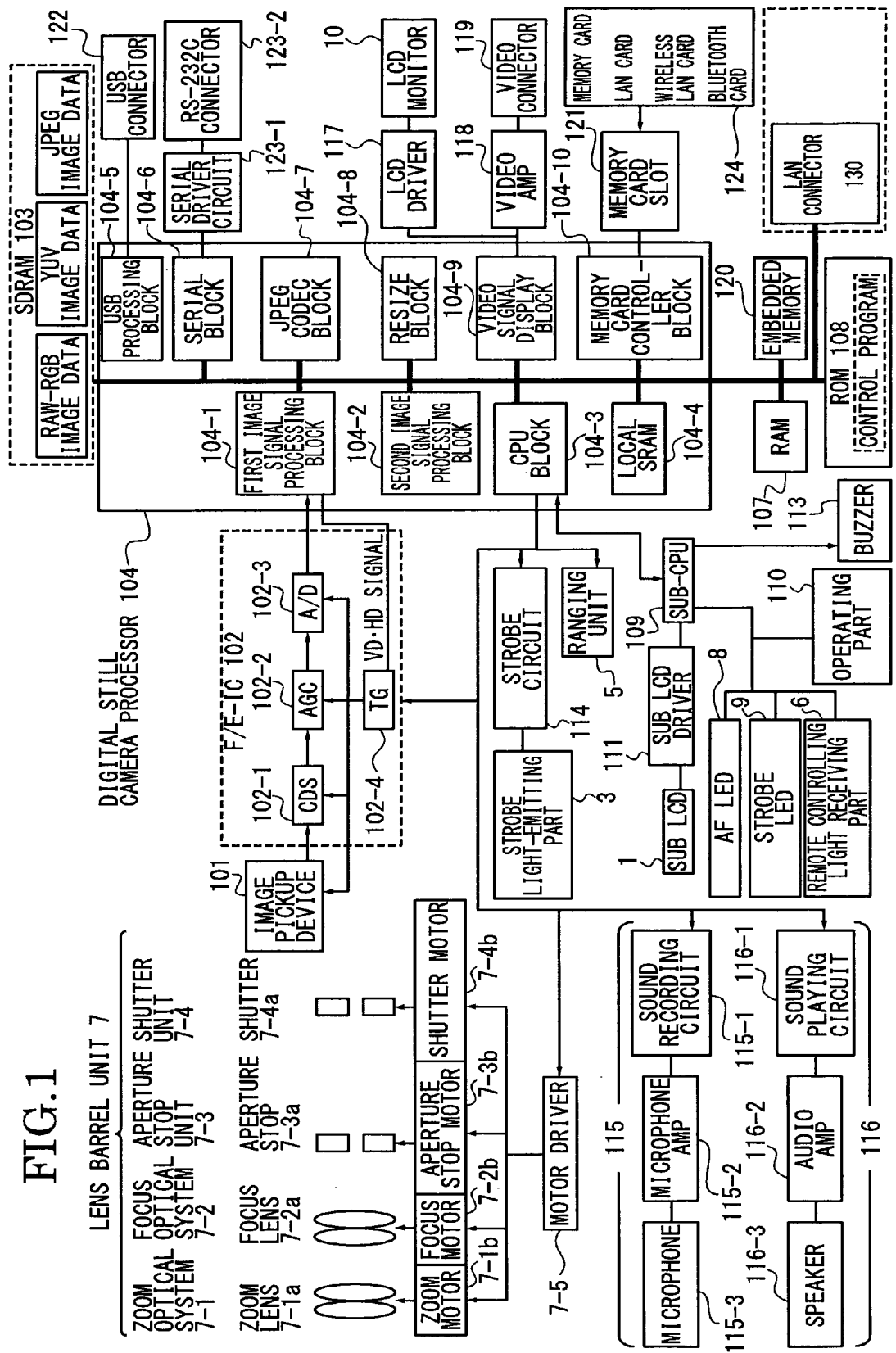
FIG. 1 is a block diagram schematically illustrating a configuration of electronic mechanical control system of a main part of a digital camera using an embodiment of the present invention.
Figure 2:
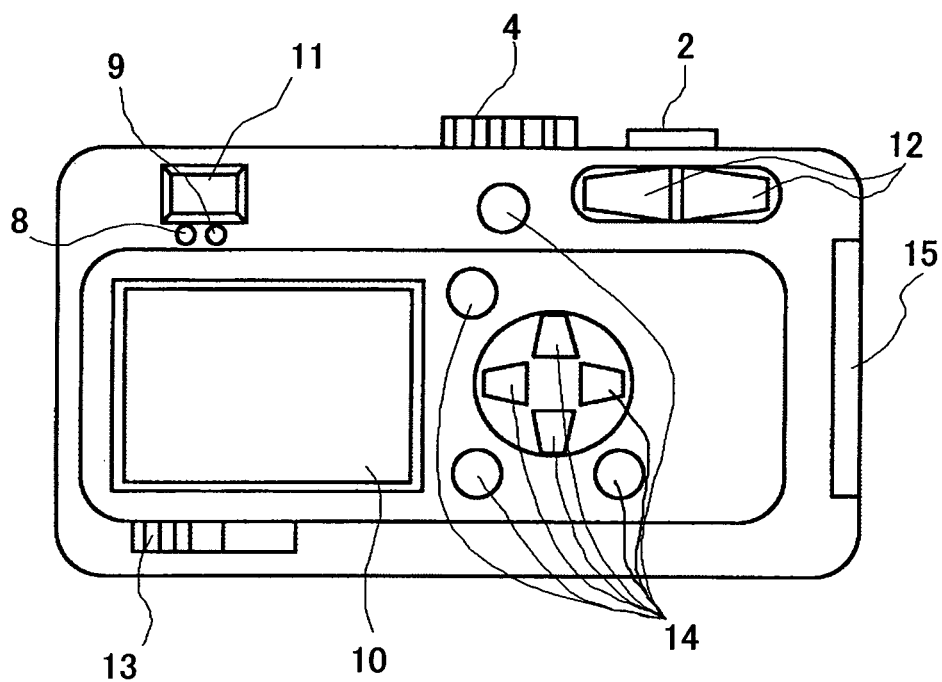
FIG. 2 is a back view schematically illustrating an appearance of the configuration of the digital camera illustrated in FIG. 1.

FIGS. 1 and 2 illustrates a configuration of a main part of a digital camera as an imaging apparatus using an embodiment of the present invention. FIG. 1 is a block diagram schematically illustrating an electronic mechanical configuration of the digital camera and FIG. 2 is a back view schematically illustrating an appearance of the configuration of the digital camera illustrated in FIG. 1.

The digital camera includes an imaging optical system such as a lens barrel unit configured to image a subject image, a solid-state image pickup device such as a CCD 101 configured to convert the subject image imaged by the imaging optical system into an electrical signal and output the electrical signal as image data, and a continuously-photographing processing device such as a camera processor 104 configured to obtain a plurality of photographed images by continuously photographing the subject through the solid-state image pickup device at a plurality of photographing positions.

The digital camera illustrated in FIGS. 1 and 2 includes a sub LCD (sub liquid crystal display) 1, a release button 2, a strobe light emitting part 3, a mode dial 4, a ranging unit 5, a remote controlling light-receiving part 6, a lens barrel unit 7, an AF LED (light emitting diode) 8, a strobe LED 9, a LCD monitor (liquid crystal display monitor) 10, an optical finder 11, a zoom button 12, a power switch 13, an operating key part 14, and a memory card loading part 15.

Instead of the sub LCD 1, the ranging unit 5, the remote controlling light-receiving part 6, the lens barrel unit 7, the AF LED 8, the strobe LED 9, and the LCD monitor 10, a control system illustrated in FIG. 1 may include an image pickup device 101, a front/end part 102, an SDRAM (synchronous dynamic random access memory) 103, a camera processor 104, a RAM (random access memory) 107, a ROM (read-only memory) 108, a sub CPU (sub central processing unit) 109, an operating part 110, a sub LCD driver 111, a buzzer 113, a strobe circuit 114, a sound recording unit 115, a sound playing unit 116, an LCD driver 117, a video amplifier 118, a video connector 119, a built-in memory 120, a memory card slot 121, a USB (universal serial bus) connector 122, and a serial interface part 123.

The lens barrel unit 7 includes a zoom optical system 7-1 having a zoom lens system 7-1a and a zoom motor 7-1b, and a focus optical system 7-2 having a focus lens system 7-2a and a focus motor 7-2b. The lens barrel unit 7 also includes an aperture stop unit 7-3 having an aperture stop 7-3a and an aperture stop motor 7-3b, a shutter unit 7-4 having a shutter 7-4a and a shutter motor 74b, and a motor driver 7-5 for driving each motor.

The front/end part 102 includes a CDS (correlated double sampling part) 102-1 for conducing a correlating double sampling for removing a noise of the image, an AGC (automatic gain control) 102-2, an A/D (analog-digital) converter 102-3, and a TG (timing generator) 102-4. The camera processor 104 includes a first image signal processing block 104-1, a second image signal processing block 104-2, a CPU block 104-3, a local SRAM (local static random access memory) 1044, a USB processing block 104-5, a serial processing block 104-6, a JPEG CODEC block 104-7, a RESIZE block 104-8, a video signal display block 104-9, and a memory card controller block 104-10.

The operating part 110 includes the release button 2, the mode dial 4, the zoom button 12. the power switch 13, and the operating key part 14, as shown in FIG. 2.

The sound recording unit 115 includes a sound recording circuit 115-1, a microphone amplifier 115-2, and a microphone 115-3, and the sound playing unit 116 includes a sound playing circuit 116-1, an audio AMP (audio amplifier) 116-2 and a speaker 116-3. The serial interface part 123 includes a serial driver circuit 123-1 and a serial connector 123-2.

The sub LCD 1, the release button 2, and the mode dial are provided on an upper surface of a camera body CB of the digital camera. The sub LCD 1 is used, for example, as a displaying part for displaying a number of photographable images or the like. The strobe light-emitting part 3, the ranging unit 5, the remote controlling light-receiving part 6, the lens barrel unit 7 and an object side of the optical finder 11 are provided on a front surface side of the camera body CB. The memory card loading part 15 for loading a memory card is provided on a left side surface viewed from an object (subject) side of the camera body CB. The memory card slot 121 is provided inside the memory card loading part 15 to load the memory card by inserting the memory card in the memory card slot 121. The AF LED 8, the strobe LED 9, the LCD monitor 10, an eye piece side of the optical finder 11, the zoom button 12, the power switch 13 and the operating key part 14 are provided on a back side of the camera body CB.

Next, with reference to FIGS. 1 and 2, a basic operation of the digital camera will be explained. In FIGS. 1 and 2, the strobe circuit 114 of the strobe light-emitting part 3 is used for compensating a light amount when light such as natural light for a subject is insufficient. That is, when imaging in a dark place or imaging a dark subject, a strobe light-emitting signal is transmitted from the camera processor 104 to the strobe circuit 114. Thereby, the strobe circuit 114 is configured to allow the strobe light-emitting part 3 to emit light so that the subject is illuminated.

The ranging unit 5 is configured to measure a distance between the camera body and the subject, that is, a subject distance. In such a digital camera, a so-called CCD-AF system is used, in which contrast of an image imaged by the optical system of the lens barrel unit 7 on an image pickup device 101 is detected and a focus lens system 7-2a is moved to a position where the highest contrast is obtained to be focused on the subject. However, in such a CCD-AF system, the contrast is searched while the focus lens system 7-2a is moved in small steps and therefore there is a problem in that a focusing operation requires time. Accordingly, information on the subject distance is constantly obtained by using the ranging unit 5 and the focus lens system 7-2a is moved to a vicinity of a position corresponding to the subject distance at one based on the obtained subject distance information so that a high speed focusing operation can be achieved.

The lens barrel unit 7 includes the zoom optical system 7-1 having the zoom lens 7-1a configured to change a focal length of the imaging optical system to image a subject image on the image pickup device 101 and the zoom motor 7-1b configured to drive the zoom lens 7-1a, and a focus optical system 7-2 having the focus lens 7-2a configured to move a focusing position of the imaging optical system and the focus motor 7-2b configured to drive the focus lens 7-2a. The lens barrel unit 7 also includes the aperture stop unit 7-3 having the aperture stop 7-3a configured to narrow a diameter of an opening in the imaging optical system and the aperture stop motor 7-3b configured to drive the aperture stop 7-3a, the shutter unit 7-4 having a shutter 74a formed by a mechanical shutter so as to mechanically open and close an optical path of the imaging optical system and the shutter motor 7-4b configured to drive the shutter 7-4a so as to open or close the shutter 7-4a, and a motor driver 7-5 for driving each motor 7-1b to 7-4b.

The motor driver 7-5 is controlled to be driven by a driving command from the CPU block 104-3 provided in the camera processor 104 based on an operational input of the remote controlling light-receiving part 6 and the operating part Key unit).

In the ROM 108, a control program, a control parameter, and the like, which are described by codes readable with the CPU block 104-3 are stored. When the digital camera is turned ON by the operation of the power switch 13 of the operating part 110, the control program is loaded in a not illustrated main memory accompanying the CPU block 104-3. Then, the CPU block 104-3 controls operations in each part of the apparatus based on the control program and temporarily stores data, which are necessary to control the operations in each part, in the RAM 107 and a Local SRAM 104-4 in the camera processor 104.

If a rewritable flash memory is used as the ROM 108, it is possible to change the control program and the control parameter so that version upgrade of functions or the like can be easily made.

The image pickup device 101 may be a solid-state image pickup device, typically, such as a CCD (charge-coupled device) or a CMOS (complementary metal-oxide semiconductor) image pickup device, or the like and configured to perform photoelectric conversion of an optical image into an electronic image signal.

The front/end part 102 includes the CDS 102-1, the AGC 102-2, the A/D converter 102-3 and the TG 1024 which are controlled by the CPU block 104-3 of the camera processor 104. The CDS 102-1 is configured to conduct a correlating double sampling of the image signal obtained by the image pickup device 101 for removing a noise of the image, the AGC 102-2 is configured to conduct gain adjustment of the image signal after the noise of the image is removed, and the A/D converter 102-3 is configured to conduct a A/D (analog-digital) conversion of the image data after the gain adjustment is conducted to provide the processed image data to a first image signal processing block 104-1 of the camera processor 104.

A signal processing operation of the CDS 102-1, the AGC 102-2, and the A/D converter 102-3 is controlled by a VD HD (vertical driving and horizontal driving) signals output from the first image signal processing block 104-1 of the camera processor via the TG 102-4. The TG 102-4 supplies a driving timing signal to the CDS 102-1, the AGC 102-2, and the A/D converter 102-3 of the front/end part 102 in response to the VD HD signals output from the first image signal processing block 104-1 as well as supplying a driving timing signal to the image pickup device 101. In this case, a front/end IC where the CDS 102-1, the AGC 102-2, the A/D converter 102-3 and the TG 102-4 are mounted on one IC (integrated circuit) chip may be preferably used as the front/end part 102. However, the front/end part 102 may be formed by separate individually circuits.

The first image signal processing block 104-1 of the camera processor 104 is, as described above, configured to supply the VD signal and the HI) signal to the TG 102-4 of the front/end part 102 and conduct processing for white balance adjustment and gamma adjustment, or the like of the digital image signal data provided from the image pickup device 101 via the front/end part 102. The second image signal processing block 104-2 of the camera processor 104 conducts a filtering process of the digital image signal data to convert primary RGB (RAW-RGB) data into brightness and color difference data, that is, YUV (YCbCr) data, or the like. The CPU block 104-3 of the camera processor 104 appropriately controls operations of each part in the camera. As described above, the local SRAM 104-4 of the camera processor 104 temporarily stores data and the like required for the control by the CPU block 104-3.

Furthermore, in the camera processor 104, the USB processing block 104-5 is connected to external devices such as a personal computer according to a USB standard and conducts USB communication with the external devices, the serial block 104-6 is connected to external devices such as a personal computer according to a serial communication standard such as RC-232C and conducts a serial communication with the external devices, the JPEG CODEC block 104-7 performs JPEG compression and extension of the image data, the RESIZE block 104-8 performs expansion/reduction of a size of the image data by interpolating process such as extrapolating/interpolating, and the like, the video signal display block 104-9 converts the image data into a video signal for displaying the image on the LCD monitor 10, an external display devices such as an LCD monitor, a TV, or the like, and the memory card controller block 104-10 controls to store a photographed image data in a memory card, a LAN card, a wireless LAN card, a bluetooth card, or the like (referred to as "memory card", hereinafter) 124 loaded in the memory card slot 121 of the memory card loading part 15 and controls writing/reading out of the photographed image stored in the memory card 124 to play the photographed image data.

The SDRAM 103 is used for storing temporarily image data when performing each process to the image data in the camera processor 104. The image data to be stored may be, for example, "RAW-RGB image data" which is sent via the front/end part 102 from the image pickup device 101 and obtained by conducting the white balance and gamma setting in the first CCD signal processing block 104-1, "YUV image data" which is obtained by performing the brightness data or color difference data conversion in the second CCD signal processing block 104-2, and/or "JPEG image data" which is obtained by performing JPEG compression in the JPEG CODEC block 104-7.

The memory card slot 121 is a connecter slot to which a detachable memory card 124 is attached. This control in writing/reading out of the memory card 123 loaded in the memory card slot 121 is performed by the memory card controller block 104-10 via the memory card slot 121. An embedded memory 120 is a memory for storing photographed image data even when a memory card is not attached to the memory card slot 121.

The LCD driver 117 is a drive circuit to drive the LCD monitor 10 and has a function for converting a video signal output from the video signal display block 104-9 into a signal for displaying on the LCD monitor 10. The LCD monitor 10 is used to monitor a state of the subject before imaging, to confirm the photographed image, and/or to display the image data stored in the memory card 124 or the embedded memory 120.

The video amplifier 118 is configured to convert the video signal output from the video signal display block 104-9 into impedance of 75□. The video connector 119 is a connector for connecting the 75□impedance output of the video amplifier 118 to the external displaying devices such as a TV.

The USB connector 122 is a connector for conducting the USB connection of the digital camera with an external device such as a personal computer and so on.

The serial interface part 123 having the serial driver circuit 123-1 and the serial connecter 123-2 is an interface for conducting the serial communication with the external devices such as a personal computer according to the standardized serial communication standard, for example, the RC-232C standard and the like. The serial driver circuit 123-1 is a circuit for performing voltage conversion of an output signal from the serial processing block 104-6 and the serial connector 123-2 is a connecter for connecting the serial output obtained by performing voltage conversion by the serial driver circuit 123-1 with the external device such as the personal computer or the like.

The sub CPU 109 is a CPU in which a ROM and RAM are loaded in one chip and which outputs an output signal from the above-mentioned operating part 110 or the remote controlling light-receiving part 6 to the CPU block 104-3 of the camera processor 104 as operational information of a user, or supplies control signals to the sub LCD 1, the AF LED 8, the strobe LED 9 and the buzzer 113 based on state information of the camera, which is output from the CPU block 104-3.

The sub LCD 1 is, for example, a displaying part for displaying a number of photographable images, or the like and the sub LCD driver 111 is a circuit for driving the sub LCD 1 based on the output signal from the sub CPU 109.

The AF LED 8 is an LED for displaying a focused state when photographing. The strobe-LED 9 is an LED for displaying a charging state of the strobe or preparing state for light emitting, that is, whether or not charging of a capacitor for a strobe light emitting is completed so that light emitting can be performed. In addition, the AF LED 8 and the strobe-LED 9 may be employed for another displaying use such as displaying an access state of the memory card 124 and the like.

The operating part 110 includes an operating key, an operating switch and an operating button and the like used by user. In this case, the operating part 110 includes the release button 2, a photographing/playing switching dial 4, the zoom button 12, the power switch 13 and the operating key part 14 and the like. The remote controlling light-receiving part 6 receives a light signal such as an infrared light signal from a not illustrated remote controlling transmitter operated by the user.

When the user input a sound signal, the sound recording unit 115 allows the microphone amplifier 115-2 to amplify the input sound signal by the microphone 115-3 and allows the sound recording circuit 115-1 to record the sound signal amplified by the microphone amplifier 115-2. The sound playing unit 116 converts the recorded sound signal into a signal for outputting and playing via a speaker by the sound playing circuit 116-1, amplifies the converted sound signal by the audio amplifier 116-2 and then output the signal amplified by the audio amplifier 116-2 by driving the speaker 116-3.

Furthermore, as shown in FIG. 1, a Bluetooth (registered mark) circuit 130 may be provided to connect the digital camera to a so-called Bluetooth device via a wireless communication according to a Bluetooth standard. On the other hand, when the Bluetooth circuit is not provided, a Bluetooth card having a function as an interface according to the Bluetooth standard may be loaded in the memory card slot 121 to connect and communicate the digital camera with another Bluetooth device.

Connecting the digital camera to a LAN (local area network) via Ethernet (registered mark) can be achieved via a not illustrated Ethernet connecting circuit or a not illustrated wireless Ethernet connecting circuit. When these Ethernet circuits are not provided, the connection can be achieved by loading a LAN card or a wireless LAN card in the memory card slot 121 via the LAN card or the wireless LAN card.

Next, configurations and operations of the digital camera configured as described above will be specifically explained.

[First Embodiment]

Figure 3:
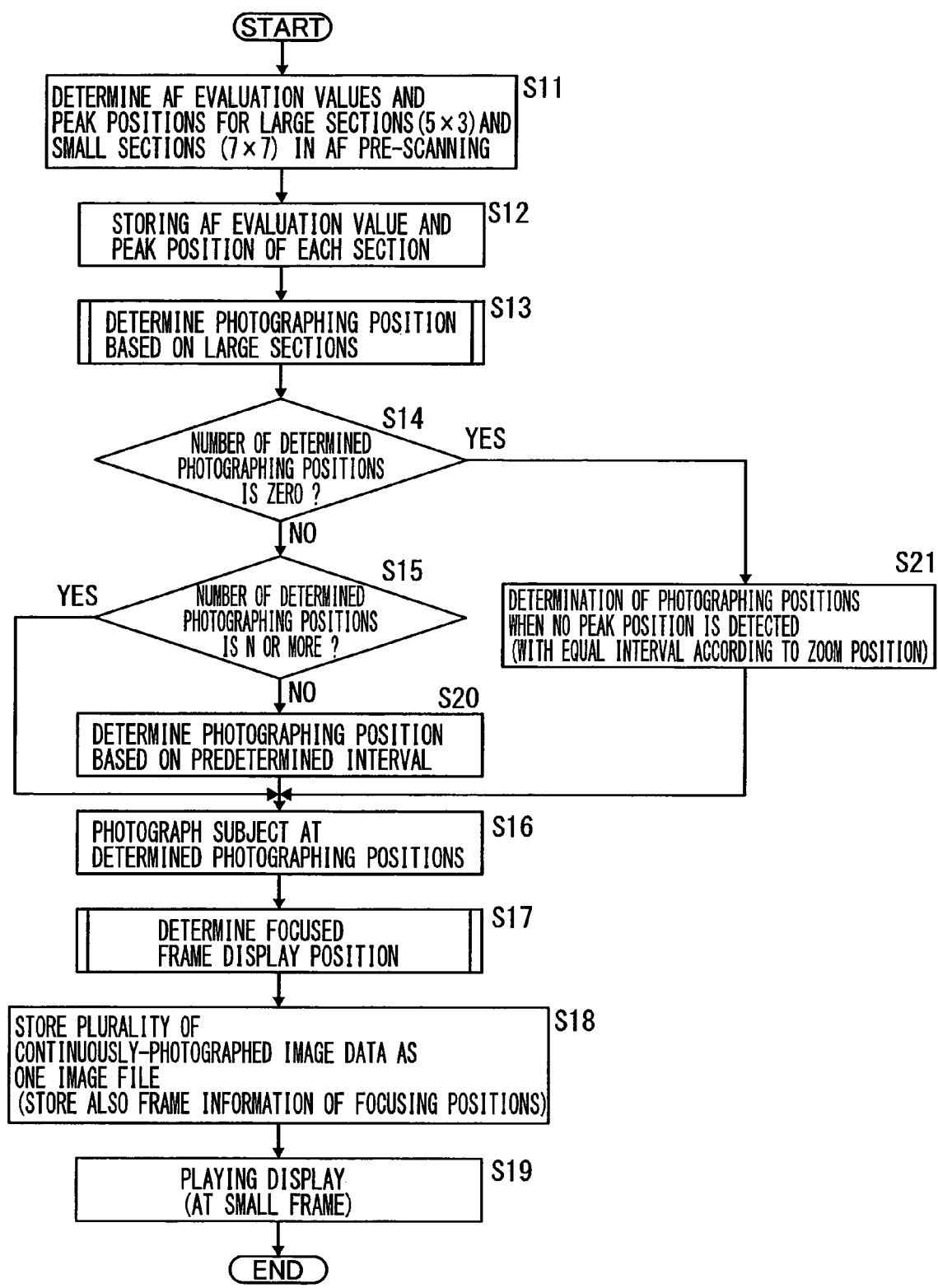
FIG. 3 is a flowchart of a whole focus bracket photographing operation in the digital camera according to a first embodiment of the present invention.
Figure 4:
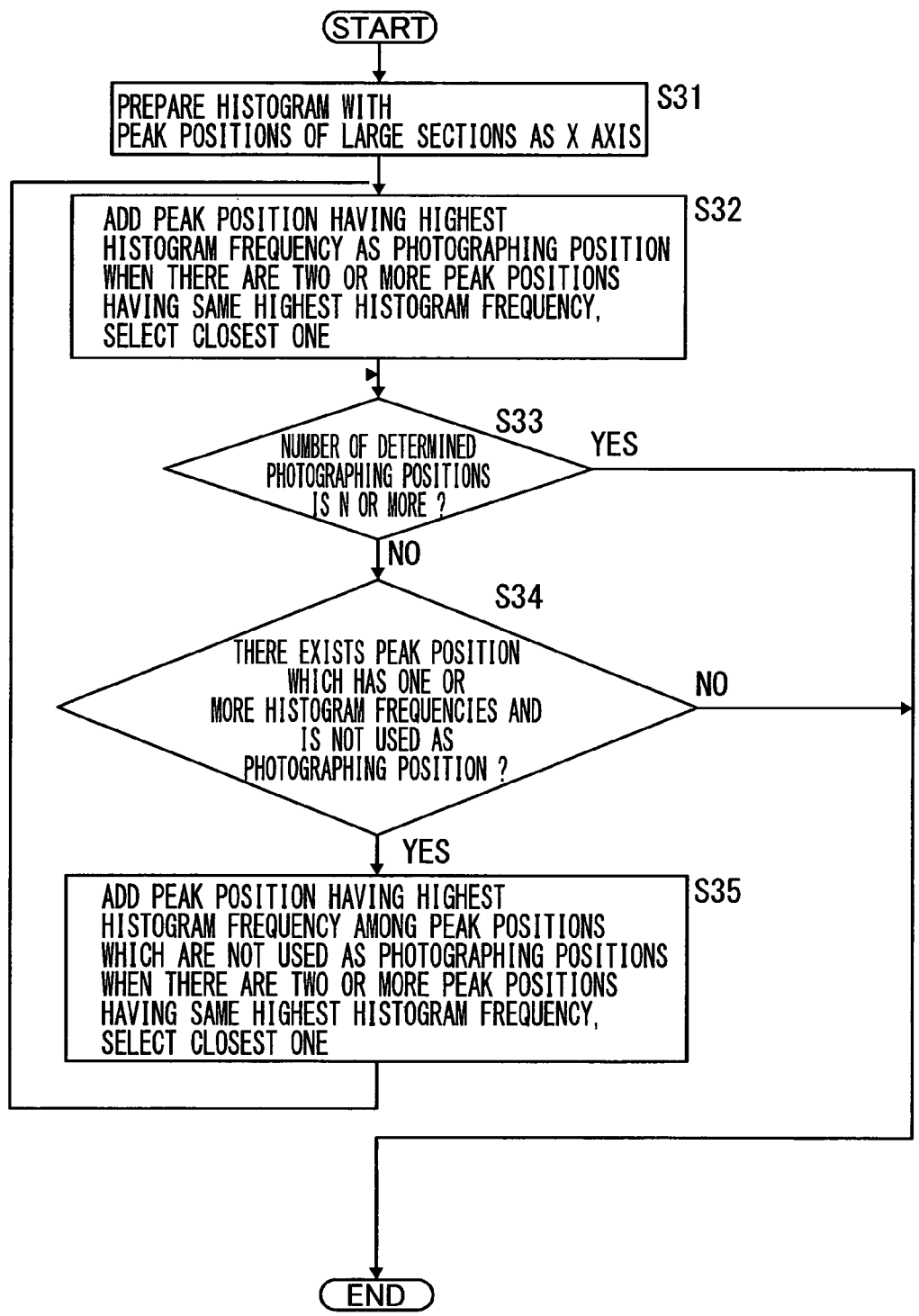
FIG. 4 is a flowchart of a photographing position determining operation using divided large sections in the flowchart shown in FIG. 3.
Figure 5:
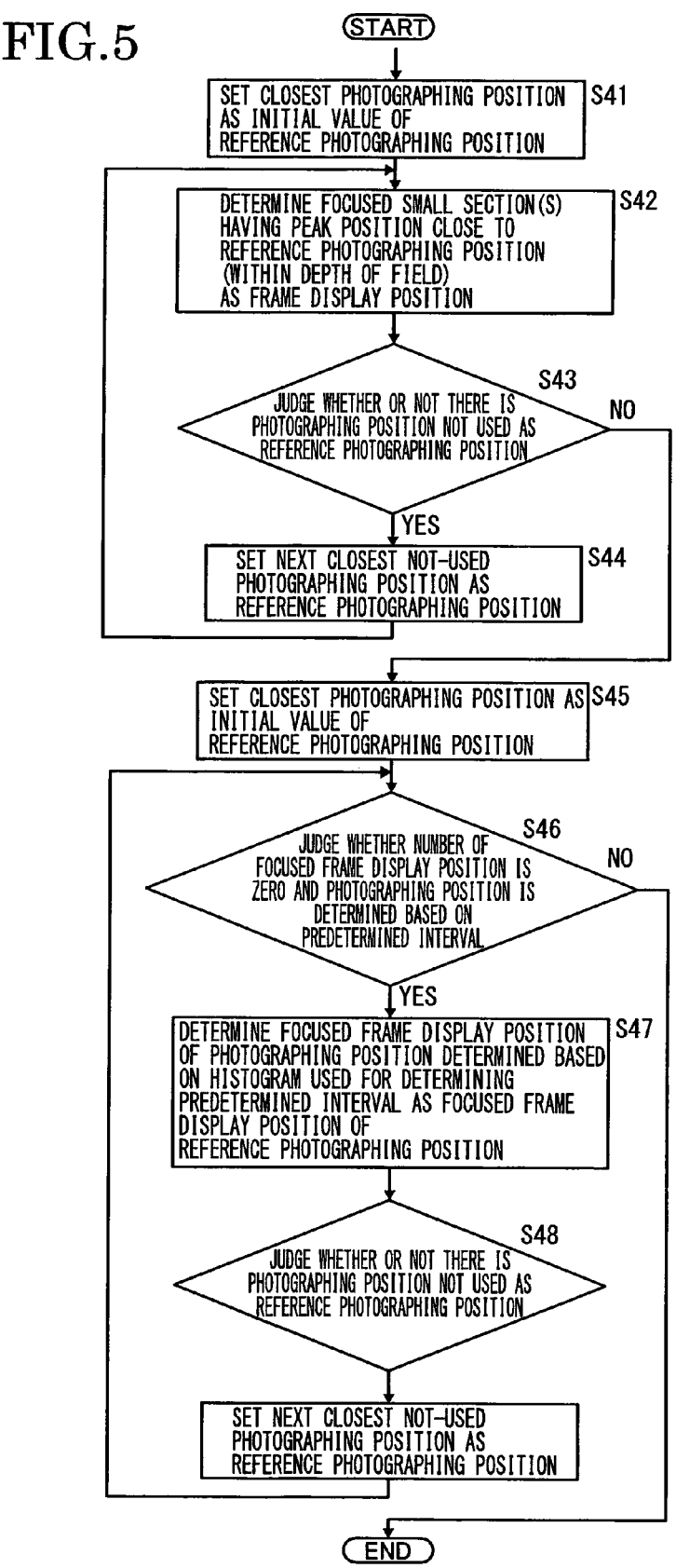
FIG. 5 is a flowchart of an operation for determining a focused frame display position in the flowchart shown in FIG. 3.

FIGS. 3, 4 and 5 are flowcharts of focus bracket photographing operations of the digital camera according to a first embodiment of the present invention. FIG. 3 is a flowchart of a whole focus bracket photographing operation in the digital camera according to the first embodiment of the present invention, FIG. 4 is a flowchart of a photographing position determining operation using divided large sections in the flowchart shown in FIG. 3 and FIG. 5 is a flowchart of an operation for determining positions to display a focused frame, that is, focused frame display positions, in the flowchart shown in FIG. 3.

The digital camera includes a photographing position determining device configured to determine a plurality of photographing positions having different focal positions of the imaging optical system to continuously photograph a subject, an image data dividing device configured to divide the image data into a plurality of sections, a section focus information obtaining device configured to obtain section focus information about a focused state of each of the plurality of sections at a plurality of reference positions, a section focusing position calculating device configured to calculate a focusing position in which each of the plurality of sections is in the focused state based on the section focus information obtained by the section focus information obtaining device, and a focusing position distribution information obtaining device configured to calculate a number of focused sections each being in the focused state at each reference position based on the focusing positions of the plurality of sections calculated by the section focusing position calculating device and obtain focusing position distribution information. The image data dividing device includes a large section dividing device configured to divide the image data into a first predetermined number of large sections each having a first predetermined size, and a small section dividing device configured to divide the image data into a second predetermined number of small sections each having a second predetermined size smaller than the first predetermined size, the second predetermined number being larger than the first predetermined number.

In the flowchart of FIG. 3, when the focus bracket photographing starts by operating the mode dial 4, the operating key part 14 and the like, at first, the image data dividing device divides entire image data into, for example, substantially 5×3 large sections (frames) and divides the entire image data into, for example, substantially 7×7 small sections (frames), and then the section focus information obtaining device obtains section focus information such as contrast information or the like as an AF evaluation value for each of large and small sections at each of the plurality of reference positions in a pre-scanning process. The section focusing position calculating device determines a peak position of the AF evaluation values (that is, focusing position) for the reference positions (step S11). The AF evaluation value and the peak position of each of large and small sections (frames) are stored (step S12). In step S12, it is preferable to store not only the AF evaluation values of the sections at the peak positions but also all of the AF evaluation values obtained in the above pre-scanning process to easily achieve debug and the like. The photographing position determining device determines the photographing positions to continuously photograph the subject based on the AF evaluation values and the peak positions of the large sections stored in step S12 (step S13).

A sub routine for determining the photographing positions based on the peak position of the AF evaluation values of the large sections in step S13 is illustrated by a flowchart in detail shown in FIG. 4. Here, the determining process of the photographing positions based on the peak positions of the AF evaluation values of the large sections shown in FIG. 4 will be specifically explained. When the determining process of the photographing positions based on the peak positions of the AF evaluation values of the large sections starts in FIG. 4, the focusing position distribution information obtaining device prepares a histogram (frequency distribution table) showing a distribution of a number of the focused large sections each having the focusing position at the reference position in relation to the peak positions corresponding to the reference position of the large sections as an x axis (step S31). The photographing position determining device adds the peak position having the highest frequency in the histogram prepared in step S31 as the photographing position (step S32). In step S32, if there are two or more peak positions having the same highest frequency, the peak position closer to the digital camera as the imaging apparatus than the other one or more peak positions or having a shorter focal length of the imaging optical system is preferentially selected. The photographing position determining device may include a device configured to, when there are two or more reference positions having the same number of the focused sections calculated by the focusing position distribution information obtaining device, preferentially select and determine the reference position closer to the digital camera than the other one or more photographing positions having the same number of the focused sections as the photographing positions to continuously photograph the subject.

It is judged whether or not a number of the photographing positions determined as described above is a predetermined number N or more, where N is a positive integer, for example, 7 (step S33) and if it is judged that the determined photographing position is N (7) or more, the process is terminated and returns to the process of FIG. 3.

In step S33, if it is judged that the number of the determined photographing positions is less than the predetermined number N of the photographing position (in this case, 7), it is judged whether or not there exists a peak position which has a frequency being one or more in the histogram prepared in step S31 and is not yet determined as the photographing position (step S34), and if not, the process terminates and returns to the process of FIG. 3. In step S34, if it is judged that there exists the peak position which has the frequency being one or more in the histogram and is not yet determined as the photographing position, the photographing position determining device adds, as the photographing position, the peak position having the highest frequency of the histogram among the peak positions which are not yet determined as the photographing position (step S35), and the process returns to step S33. If there are two or more peak positions having the same highest frequency in the histogram in step S35, the peak position closer to the digital camera than the other one or more peak positions is preferentially selected.

When the process returns to the process of FIG. 3 after the processes of FIG. 4 (step S13 of FIG. 3), it is judged whether or not a number of the determined photographing positions is zero (step S14). If not zero, it is judged whether or not the number of the determined photographing positions is N (in this case, 7) or more (step S15). If it is judged that the number of the determined photographing positions is N or more in step S15, the continuously-photographing processing device continuously photographs a subject at the determined photographing positions (step S16).

In step S16, if the number of the determined photographing positions exceeds N, the photographing position closer to the digital camera than the other photographing positions is preferentially selected to determine the photographing positions of N (in this case, 7).

The digital camera may include an image displaying device configured to display images continuously photographed at the plurality of photographing positions determined by the photographing position determining device by the continuously-photographing processing device, and a focused frame displaying device configured to display a frame indicating the focused section having the focusing position corresponding to the photographing position of the photographed image by superimposing the frame on the photographed image by the image displaying device.

The photographing position determining device may include a device configured to preferentially select and determine the reference position having the largest number of the focused sections calculated by the focusing position distribution information obtaining device as the photographing positions different from each other. The continuously-photographing processing device may include a storing device configured to store the plurality of images photographed at the plurality of photographing positions as one image file storing the plurality of image data and frame information to display a frame indicating the focused section having the focusing position corresponding to the photographing position of the photographed image. The continuously-photographing processing device may include a device configured to store the frame information to display the frame indicating the focused section having the focusing position corresponding to the photographing position of each photographed image in the identical image file as information accompanying the image data corresponding to the photographed image.

In this embodiment, after the continuously photographing the subject at the determined photographing positions in step S16, a process for determining a focused frame display position is performed as shown in FIG. 5 (step S17). Then, a series of N image data (in this case, seven image data) obtained by continuously photographing the subject are stored as one image data file by accompanying focused frame display information as described later with reference to FIGS. 9 and 10 (step S18) and the image displaying device displays the stored image (step S19) and then the process is completed.

In addition, if it is judged that the number of the determined photographing positions is less than N (in this case, 7) in step S15, as described later in detail, the photographing position determining device determine the photographing position or positions with a predetermined interval (step S20), and the process proceed to step S16, the continuously photographing is performed at the N photographing positions determined by preferentially selecting the reference position closer to the digital camera than the other reference positions.

Furthermore, if it is judged that the number of the determined photographing positions is zero in step S14, as described in detail with reference to FIG. 8, that is, no peak position is not detected, the photographing position determining device determines the photographing positions obtained by setting the photographing positions at an equal interval according to the zoom position (step S21). Then the process returns to step S16 and the continuously-photographing processing device continuously photographing the subject at the N determined photographing positions by preferentially selecting the reference position closer to the digital camera than the other reference positions.

A sub routine of processes for determining the focused frame display position of step S17 is illustrated in the flowchart in detail in FIG. 5. Here, the processes for determining the focused frame display position of FIG. 5 are specifically explained. As the focused frames to be displayed, frames of the small sections which are obtained by dividing the image data into sections more than the number of the large sections as described above are used. When the determining process of the focused frame display position starts in FIG. 5, at first, the photographing position having the closest distance is set to an initial value of a first reference position (step S41). The frames indicating one or more small sections each having the peak position close to the first reference position set in step S41, that is, for example, each having the peak position within a depth of field of the first reference position are determined as the focused frame display positions (step S42). It is judged whether or not there is the reference position which is not yet used as the first reference position (step S43). If it is judged that there is the reference position which is not yet used as the first reference position in step S43, the reference position having the closest distance to the digital camera next the previously set first reference photographing position among them is set as the first photographing position (step S44), and then the process returns to step S42.

If it is judged that there is no reference position which is not yet used as the first reference photographing position in step S43, the reference position having the closest distance to the digital camera is set as an initial value of a second reference photographing position (step S45). Then, it is judged whether or not a number of the focused frame display positions determined corresponding to the second reference photographing positions set in step S45 is zero and the photographing positions are determined based on the predetermined interval in step S20 of FIG. 3 (step S46). If it is judged that the second reference photographing position is determined based on the predetermined interval in step S46, the focused frame display position determined by the histogram used when the predetermined interval is determined is determined as the focused frame display position of the second reference photographing position (step S47) and then it is judged whether or not there is the reference position which is not yet used as the photographing position (step S48). If it is judged that the second reference photographing position is not determined based on the predetermined interval in step S46, the process proceeds to step S48 and then it is judged whether there is the reference position which is not yet used as the second reference photographing position.

If it is judged that there are the reference positions which is not yet used as the second reference photographing position in step S48, the reference position having the closest distance to the digital camera next to the previously set second reference photographing position among them is set as the second reference photographing position (step S49) and the process returns to step S46. If it is judged that there is no reference position which is not yet used as the second reference photographing position in step S48, the process terminates and returns to step S18 in the flowchart of FIG. 3.

Figure 6:
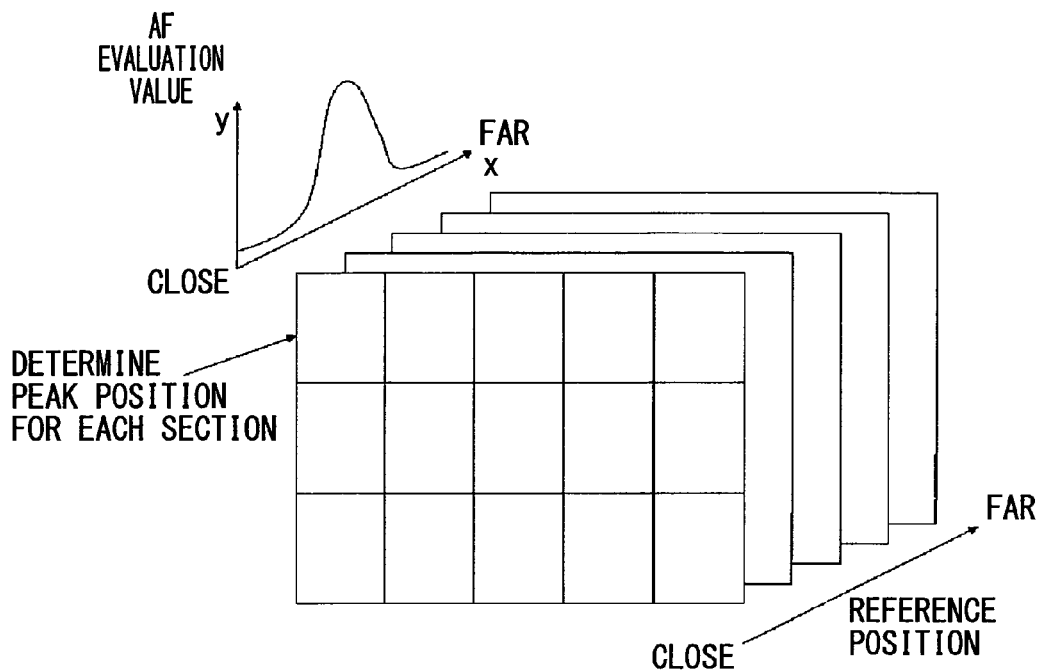
FIG. 6 is a schematic view explaining a concept of peak detection of the AF evaluation values in the digital camera according to the first embodiment of the present invention.

That is, the photographing positions are determined by dividing the entire (or at least main part of) image date into a plurality of sections and by using the histogram of the focused positions each having the highest AF evaluation value at each of the plurality of sections FIG. 6 is a schematic view explaining a concept of peak detection of the AF evaluation values. As shown in FIG. 6, the image data is divided into a plurality of sections, the AF evaluation value of each of the plurality of sections is calculated from the reference position having a close distance to the reference position having a far distance and a curve of the AF evaluation values as a y axis in relation to the reference positions as an x axis for each section is prepared and a peak position of the curve is detected to obtain the focusing position for each section, where the AF evaluation value has the maximum value for each section. This is the process performed in step S11 of FIG. 3.

Figure 7:
FIG. 7 is a schematic view illustrating a concept of determining photographing positions by using a histogram in the digital camera according to the first embodiment of the present invention.
Figure 7:
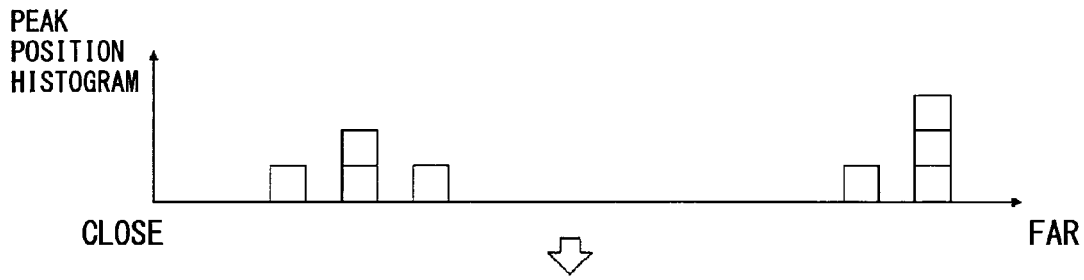
Figure 7:
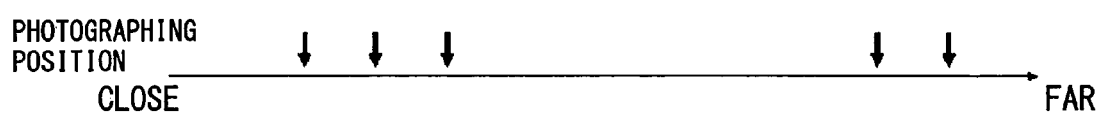

FIG. 7 is a schematic view illustrating a concept of determining photographing positions by using the histogram. As shown in FIG. 7, the sections each having the highest AF evaluation value at each of the plurality of reference positions is cumulated at each reference position and a histogram showing a distribution of a frequency of the focused sections is prepared for each reference position to determine the photographing positions. Such a process is performed in step S13 of the flowchart of FIG. 3, that is, as shown in a sub routine of the flowchart of FIG. 4.

As described above, the frames indicating the small sections which are obtained by dividing the image data into a plurality of sections smaller than the large sections used for determining the photographing positions are used as the focused frames. In this case, the size of sections used for displaying frames is different from the size of sections used for determining photographing positions so that it can be achieved both that the photographing positions can be appropriately determined even in a case where the peak positions are not sufficiently detected due to the subject having continuously-changed focal positions, for example, a tree-lined street by setting a small number of frames and a large size of sections, and that focused frames are finely displayed. In addition, when the size of frames is small, erroneous focusing easily occurs due to camera shake, noise, and the like. Accordingly, the size of frames or sections for determining the photographing positions is set to be large in order to reduce provability of photographing at an erroneous focusing position.

For example, large frames, that is, the large sections for determining the photographing positions are set by dividing the image data into 5×3, that is, 15 areas, as an example. Since it is preferable to have a section at a center of the image data, the image data is divided into odd number×odd number, in this embodiment. Furthermore, small frames, that is, the small sections for displaying the focused frames are set by dividing the image data into 7×7, that is, 49 areas as an example. However, the size of frames or sections is not limited thereto. In addition, in the first embodiment, the size of the large section (large frame) is different from that of the small section (small frame), the two types of sections may be set to have the same size. The photographing position may be determined based on the large sections in
The photographing position determining device may include a device configured to determine the plurality of photographing positions in descending order of the frequency of the histogram, for example, in descending order of the number of focused large sections calculated by the focusing position distribution information obtaining device. When two or more large sections have the same frequency of the histogram, the large section having a closer distance to the imaging apparatus than the other one or two large sections is preferentially selected as the photographing position. In this case, the photographing position may be determined in ascending order of the distance.

Figure 8:
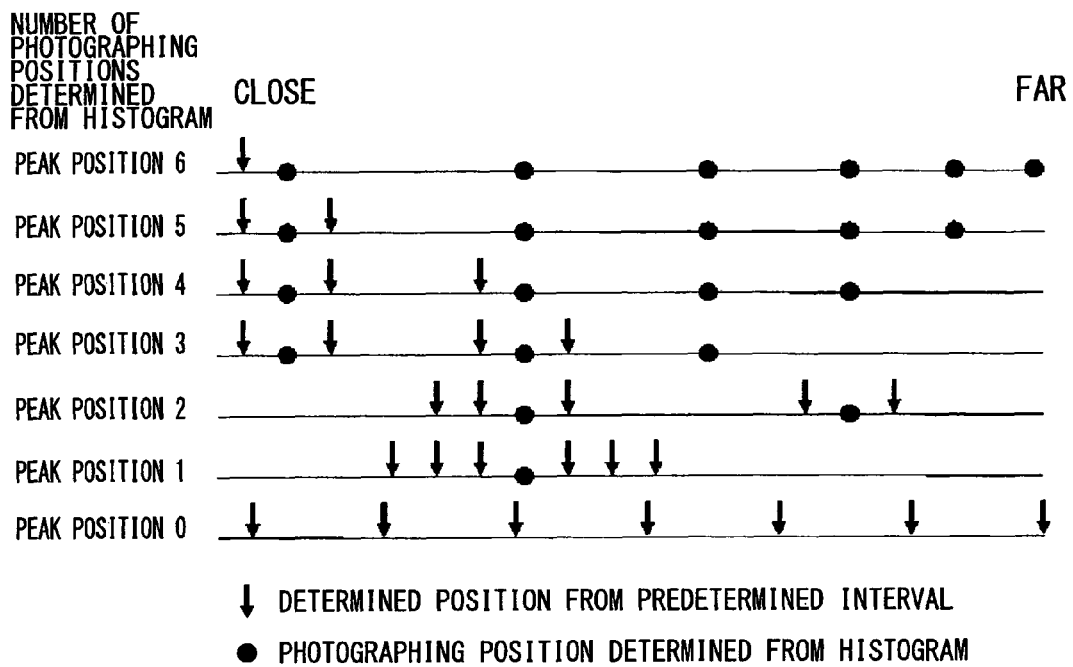
FIG. 8 is a schematic view explaining concept of the determining method for determining the photographing position by using a predetermined interval in the digital camera according to the first embodiment of the present invention.

Moreover, when the number of the determined photographing positions is less than the predetermined number N, in this case, 7, the photographing position is added according to a pattern shown in FIG. 8.

The photographing position determining device may include a device configured to determine the photographing position to continuously photograph the subject, when a number of the photographing positions determined based on the focusing positions of the plurality of sections calculated by the section focusing position calculating device based on the section focus information obtained by the section focus information obtaining device is less than the predetermined number of the photographing positions by additionally setting a photographing position with a predetermined interval based on the previously-determined photographing position.

FIG. 8 is a schematic view explaining a concept of the determining method for determining the photographing position, when the number of the photographing positions determined based on the peak positions obtained from the histogram is less than the predetermined number N (in this case, 7). In FIG. 8, filled circles indicate the photographing positions determined from the histogram, arrows indicate the photographing positions determined, when the number of the photographing positions determined from the histogram is less than the predetermined number N (in this case, 7), by the predetermined intervals. In FIG. 8, the predetermined number N is set to 7 as an example, but it is not limited thereto.

If the number of the photographing positions determined from the histogram is 6 to 3, the photographing position is added or additionally determined in order from the closest one of the previously determined photographing positions to the imaging apparatus, at first at a front side and then a back side of the one of the previously determined photographing positions with the predetermined interval until the number of the photographing positions achieves the predetermined number N (7). It is preferable to calculate the predetermined interval to add the photographing positions based on the reference positions such as zoom positions. The predetermined interval is preferably determined based on the depth of field. The interval may be variously determined, for example, as the same as or 2.5 times of the depth of field according to the focal length of the imaging optical system and it is preferable to determine the interval such that user feels it effective.

If the number of photographing positions determined from the histogram is two or one, since the number of the determined photographing positions does not achieve the predetermined number N (7) only in the above described process, similarly to the above described process, further photographing positions are added or additionally determined in order from the closest one of the previously determined photographing positions to the imaging apparatus at first at a front side and then a back side of each of the photographing positions determined in the above described process with the predetermined interval, in sequence until the number of the determined photographing positions achieves the predetermined number N (7).

Furthermore, if no photographing position is determined from the large sections, as shown by a case "peak position 0" in FIG. 8, the photographing positions are determined from the predetermined interval and positions. In this case, the interval between the photographing positions is calculated based on the zoom position and the depth of field.

As described with reference to FIG. 5, the position of the focused frame indicating the small section(s) having the peak position close to each photographing position, that is, within the depth of field of each photographing position is determined as the focused frame display position. Moreover, if the number of the focused frame display position is zero and there is a photographing position determined by using the predetermined interval after the focused frame display position is determined, the photographing position determined from the histogram which is used for determining the predetermined interval is determined as the focused frame display position of the reference photographing position. This is to prevent the focused frame from being displayed.

in a case where the

Then, Storing format where a series of N image data (in this case, seven image data) obtained by continuously photographing the subject are stored as one image data file by accompanying focused frame display information in step S18 of FIG. 3 will be explained.

Figure 9:
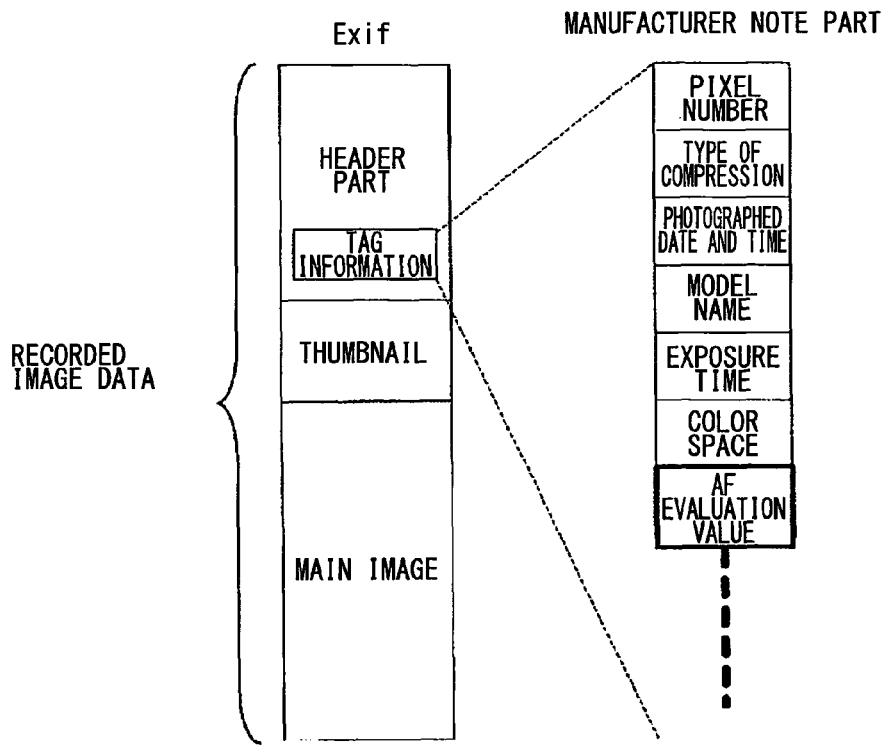
FIG. 9 is a schematic view illustrating a format for recording an image to be recorded in an Exif (Exchangeable Image File Format) normalized by JEIDA (Japan Electronics Industry Development Association).
Figure 10:
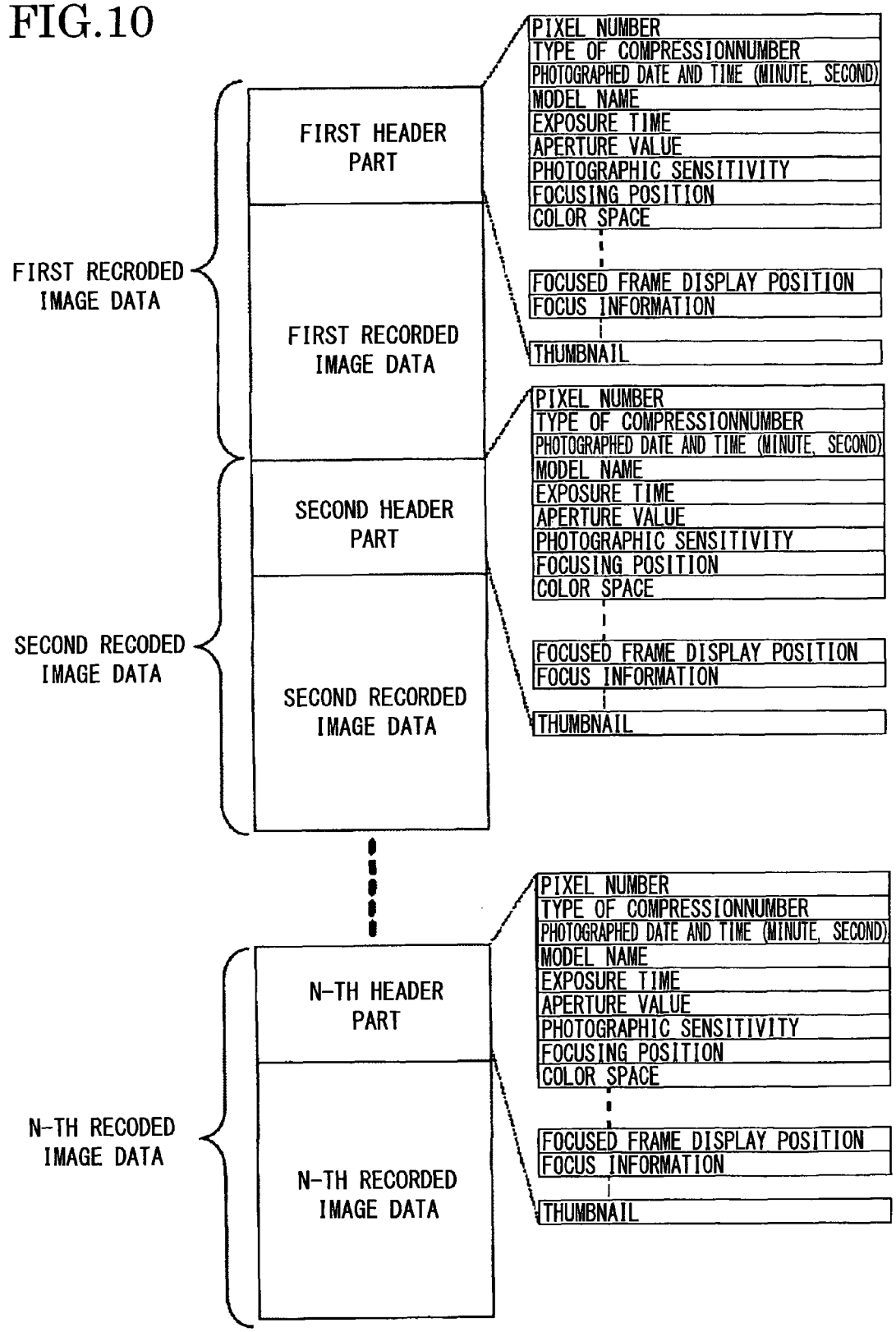
FIG. 10 is a schematic view illustrating an example of a storing format of a multipage file used in the digital camera according to the first embodiment of the present invention.

FIG. 9 is a schematic view illustrating a format for recording an image to be recorded in an Exif (Exchangeable Image File Format) normalized by JEIDA (Japan Electronics Industry Development Association). FIG. 10 is a schematic view illustrating an example of a storing format of a multipage file used in this embodiment.

The N (7) images continuously photographed while changing the photographing position in the focus bracket photographing are stored as one multipage file storing the photographed images and coordinate information indicating a coordinate of the focused frame(s) of each photographed image, accompanying each photographed image.

In a case where the focused frame display information and focused information of each photographed image are, for example, stored in the Exif format normalized by JEIDA as shown in FIG. 9, the focused frame display information and the focused information are written with information on a model of the digital camera, photographing date and time, an aperture value, a shutter speed, and the like in tag information region of a header part (individual region for each manufacturer) to be stored as the recorded image data for the multipage file.

Such a plurality of the recorded image data are, as shown in FIG. 10, the recorded image data of the N recorded images photographed in the focus bracket photographing are sequentially combined for a multipage file. That is, in the multipage file shown in FIG. 10, a recorded image header part and a recorded image part forms each recorded image data for the multipage file and combined in order of the recorded image data obtained by performing the focus bracket photographing.

Each recorded image header part includes photographing condition data which is data when photographing each recorded image, for example, a pixel number, type of compression, photographed date and time (including minutes and seconds) of the recorded image, a model, an exposure time, an aperture value, a photographic sensitivity, a focusing position, a color space of the imaging apparatus used for photographing the recorded image and the like. Furthermore, focused frame display position information showing positions each indicating the focused frame in each recorded image and AF evaluation values as focus information are also included. Thumbnails of the recorded images are also stored in the recorded image header part.

Due to such a configuration, the image including no focused frame indicating section focusing on the subject is not photographed and the predetermined number of photographing positions can be appropriately assigned if at all possible with each part shown in the photographed images within the predetermined number of photographed images. It is possible to effectively show which part is in a focused state in the plurality of images to user.

[Second Embodiment]

In the above described first embodiment, two types of sections are used for the different processes, that is, the large sections are used for determining the photographing positions and the small sections are used for determining the focused frame display positions. When the size of the frames, that is, the sections is small, erroneous focusing easily occurs due to influence of camera shake and noises. Accordingly, when only large frames, that is, large sections are used for determining the photographing positions, provability of photographing at erroneous focusing position can be reduced. The photographing position determining device may be configured to determine the photographing position only based on the focusing position distribution information of the large sections calculated by the focusing position distribution information obtaining device.

However, there is a case where it is preferable to obtain the focused sections at fine parts in the images even if provability of photographing at the erroneous focusing parts is increased. Therefore, in the second embodiment, the large sections (large frames) are firstly used for determining the photographing positions and if the number of the photographing positions is less than the predetermined number N of the photographing positions, the small sections are used for determining the photographing positions to obtain the image having finely focused sections.

The photographing position determining device may include a device configured to determine one or more reference positions different from each other as the photographing positions based on the focusing position distribution information of the large sections obtained by the focusing position distribution information obtaining device for the plurality of large sections, and when a number of the photographing positions determined based on the focusing position distribution information of the large sections is less than a predetermined number of the photographing positions, to additionally determine the reference position as the photographing position based on the focusing position distribution information of the small sections obtained by the focusing position distribution information obtaining device for the plurality of small sections such that the predetermined number of the determined photographing positions different from each other is obtained.

Figure 11:
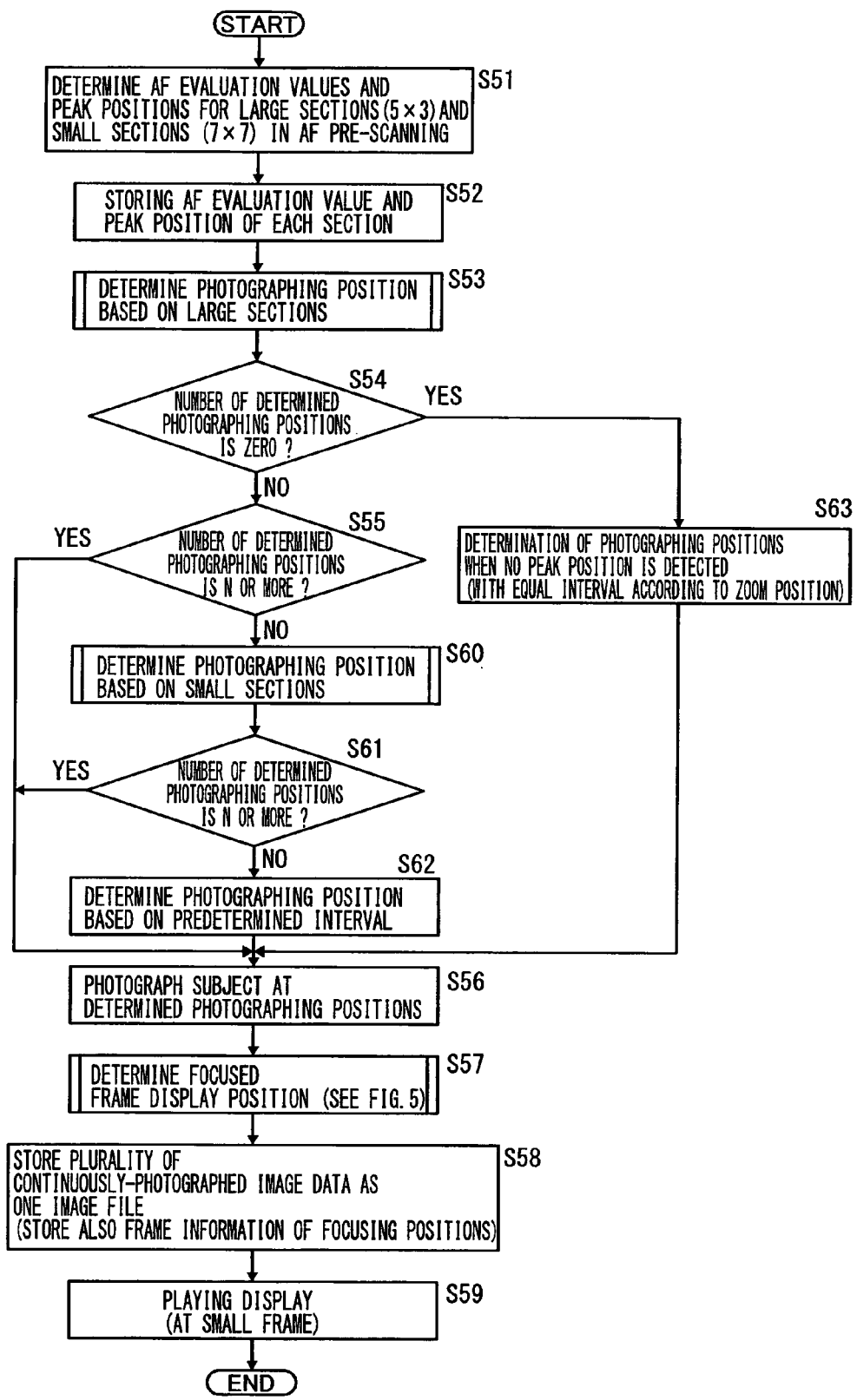
FIG. 11 is a flowchart of a whole focus bracket photographing operation in the digital camera according to a second embodiment of the present invention.
Figure 12:
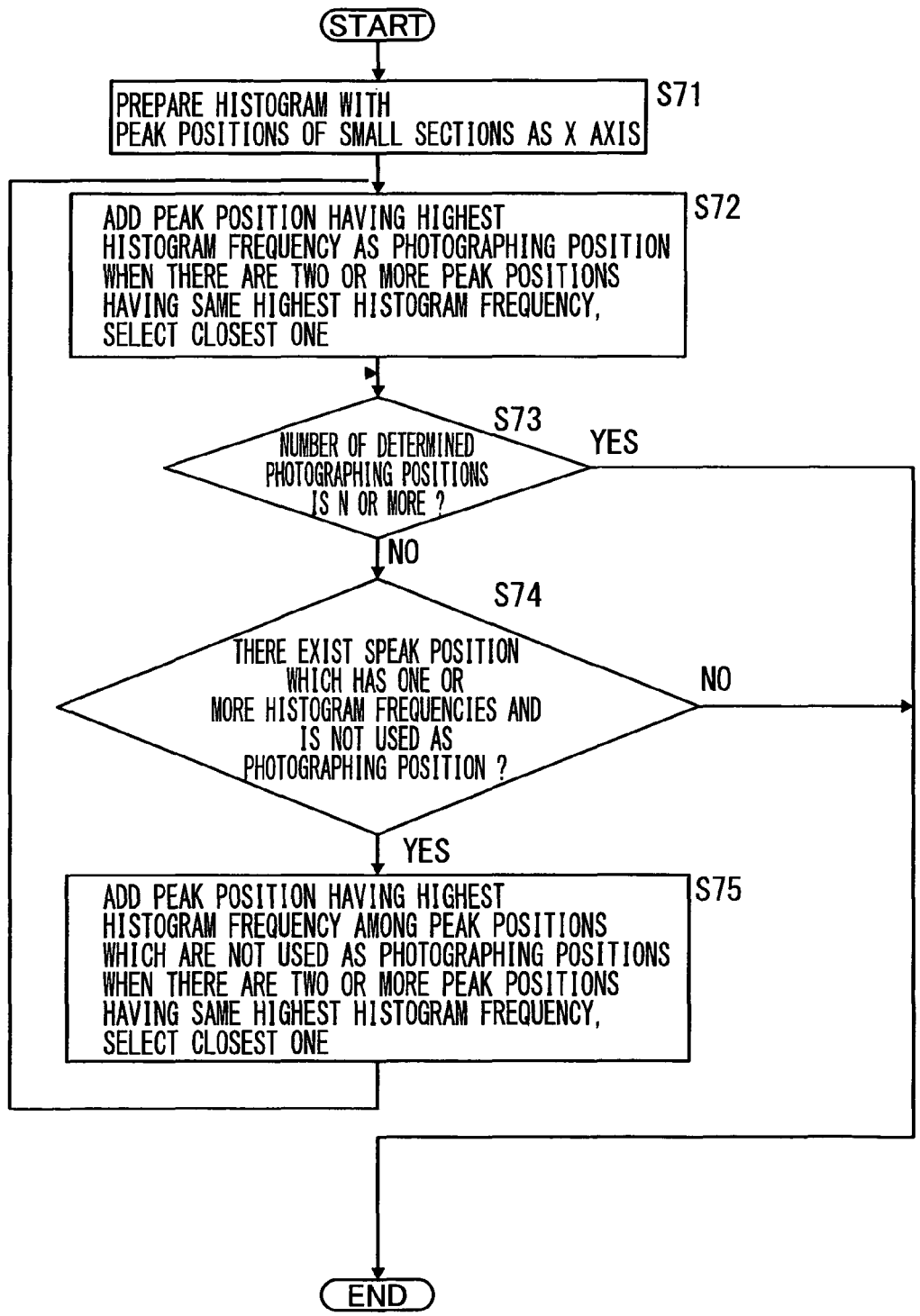
FIG. 12 is a flowchart of photographing position determining operation using divided small sections in the flowchart shown in FIG. 11.

FIGS. 11 and 12 are flowcharts of focus bracket photographing operations of the digital camera according to the second embodiment of the present invention. FIG. 11 is a flowchart of a whole focus bracket photographing operation in the digital camera according to the second embodiment of the present invention, and FIG. 12 is a flowchart of a sub routine of photographing position determining operation using divided small sections in the flowchart shown in FIG. 11. The photographing position determining operation using the divided large sections in the flowchart of FIG. 11 is the same as that of the flowchart in FIG. 4 and the focused frame display position determining operation in the flowchart of FIG. 11 is the same as that of the flowchart in FIG. 5.

In the flowchart of FIG. 11, when the focus bracket photographing starts by operating the operating part 110 such as the mode dial 4, the operating key part 14 and the like, at first, focused information such as contrast information and the like such as the AF evaluation values and peak positions (focusing positions) of the AF evaluation value of each sections (frames), for example, the large sections (frames) obtained by dividing the entire image data into substantially 5×3 and, for example, the small sections (frames) obtained by dividing the entire image data into substantially 7×7 are obtained in the pre-scanning process (step S51). The AF evaluation value and the peak position of each of large and small sections (frames) are stored (step S52).

In step S52, it is preferable to store not only the AF evaluation values of the sections at the peak positions but also all of the AF evaluation values obtained in the above pre-scanning process to easily achieve debug and the like. The photographing position determining device determines the photographing positions to continuously photograph the subject based on the AF evaluation values and the peak positions of the large sections (frames) stored in step S52 (step S53).

The photographing position determining process based on the peak positions of the AF evaluation values of the large sections in step S53 is shown in FIG. 12 and similar to the process shown in the flowchart of FIG. 4

When the process of FIG. 12 (step S53 of FIG. 11) is completed, it is judged whether or not a number of the determined photographing positions is zero (step S54). If not zero, it is judged whether or not the number of the determined photographing positions is N (in this case, 7) or more (step S55). If it is judged that the number of the determined photographing positions is N or more in step S55, the continuously-photographing processing device continuously photographs a subject at the determined photographing positions (step S56). In step S56, if the number of the determined photographing positions exceeds N, the photographing position closer to the digital camera than the other photographing positions is preferentially selected to determine the photographing positions of N (in this case, 7).

In this embodiment, after the continuously photographing the subject at the determined photographing positions in step S56, a process for determining a focused frame display position is performed as shown in FIG. 5 (step S57). Then, a series of N image data (in this case, seven image data) obtained by continuously photographing the subject are stored as one image data file by accompanying focused frame display information as described above (step S58) and the image displaying device displays the stored image (step S59) and then the process is completed.

In addition, if it is judged that the number of the determined photographing positions is less than N (in this case, 7) in step S55, the photographing position is determined based on the peak positions of the AF evaluation values of the small sections (frames) stored in step S52 (step S60).

The photographing position determining process based on the AF evaluation values of the small sections in step S60 is shown in detail in the flowchart of FIG. 12. Next, the photographing position determining process based on the peak positions of the AF evaluation values of the small sections as shown in FIG. 12 will be specifically explained. When the photographing positions determining process based on the peak positions of the AF evaluation values of the small sections starts in FIG. 12, the focusing position distribution information obtaining device prepares a histogram (frequency distribution table) showing a distribution of a number of the focused small sections each having the focusing position at the reference position in relation to the peak positions corresponding to the reference position of the small sections as an x axis (step S71). The photographing position determining device adds the peak position having the highest frequency in the histogram prepared in step S71 as the photographing position (step S72). In step S72, if there are two or more peak positions having the same highest frequency, the peak position closer to the digital camera than the other one or more peak positions is preferentially selected.

It is judged whether or not the number of sum of the photographing positions determined in step S53 of FIG. 11 and the photographing positions determined in step S72 of FIG. 12 is a predetermined number N or more, where N is a positive integer, for example, 7 (step S73) and if it is judged that the number of the determined photographing position is N (7) or more, the process is terminated and returns to the process of FIG. 11.

In step S73, if it is judged that the number of the determined photographing positions is less than the predetermined number N of the photographing position (in this case, 7), it is judged whether or not there exists a peak position which has a frequency being one or more in the histogram prepared in step S71 and is not yet determined as the photographing position (step S74), and if not, the process terminates and returns to the process of FIG. 11. In step S74, if it is judged that there exists the peak position which has the frequency being one or more in the histogram and is not yet determined as the photographing position, the photographing position determining device adds, as the photographing position, the peak position having the highest frequency of the histogram among the peak positions which are not yet determined as the photographing position (step S75), and the process returns to step S73. If there are two or more peak positions having the same highest frequency in the histogram in step S75, the peak position closer to the digital camera than the other one or more peak positions is preferentially selected.

When the process returns to the process of FIG. 11 after the processes of FIG. 12 (step S60 of FIG. 11), it is judged whether or not a number of the determined photographing positions is N (7) or more (step S61). If it is judged that the number of the determined photographing positions is N or more in step S61, the process proceeds to step S56, and then the continuously-photographing processing device continuously photographs a subject at the determined photographing positions (step S56).

In addition, if it is judged that the number of the determined photographing positions is less than N (in this case, 7) in step S61, as described above with reference to FIG. 8, the photographing position is determined based on the predetermined interval (step S62) and the process proceeds to step S56 and the continuously photographing is performed at the N photographing positions determined by preferentially selecting the reference position closer to the digital camera than the other reference positions.

Furthermore, if it is judged that the number of the determined photographing positions is zero in step S54, as described above with reference to FIG. 8, that is, no peak position is not detected, the photographing position determining device determines the photographing positions obtained by setting the photographing positions at an equal interval according to the zoom position of the imaging optical system (step S63). Then the process returns to step S56 and the continuously-photographing processing device continuously photographing the subject at the N determined photographing positions by preferentially selecting the reference position closer to the digital camera than the other reference positions.

The focused frame display position determining process in step S57 is similar to the process shown in the flowchart of FIG. 5 and therefore the explanation is omitted.

Differences between the second embodiment and the above described first embodiment is adding the photographing position determining process using the small sections as step S60 in the flowchart of FIG. 11 (the photographing position determining process using the small sections is almost the same process as the photographing position determining process using the large sections, as shown in FIG. 12)

According to such a configuration, if the number of the photographing positions determined from the large sections is less than N, the photographing position is determined from the small sections so that finely focusing in the photographed image can be achieved rather than the case where the photographing position is determined only based on the large sections. However, if the size of the sections is small, the erroneous focusing position due to camera shake and noises and therefore provability of photographing at the erroneous focusing position should be considered.

[Effects of the Invention]

According to an embodiment of the present invention, an imaging apparatus, a reproduction displaying apparatus, an image recording method and a reproduction displaying method, capable of effectively reducing unnecessary photographing of images when continuously photographing a plurality of images sequentially at a plurality of photographing positions and easily confirming the focused part in the photographed image can be provided.

According to an embodiment of the present invention, an imaging apparatus, includes an imaging optical system configured to image a subject image, a solid-state image pickup device configured to convert the subject image imaged by the imaging optical system into an electrical signal and output the electrical signal as image data, a photographing position determining device configured to determine a plurality of photographing positions having different focal positions of the imaging optical system to continuously photograph a subject, a continuously-photographing processing device configured to obtain a plurality of photographed images by continuously photographing the subject through the solid-state image pickup device at the plurality of photographing positions determined by the photographing position determining device, an image data dividing device configured to divide the image data into a plurality of sections, a section focus information obtaining device configured to obtain section focus information about a focused state of each of the plurality of sections at a plurality of reference positions, a section focusing position calculating device configured to calculate a focusing position in which each of the plurality of sections is in the focused state based on the section focus information obtained by the section focus information obtaining device, and a focusing position distribution information obtaining device configured to calculate a number of focused sections each being in the focused state at each reference position based on the focusing positions of the plurality of sections calculated by the section focusing position calculating device and obtain focusing position distribution information. The image data dividing device includes a large section dividing device configured to divide the image data into a first predetermined number of large sections each having a first predetermined size, and a small section dividing device configured to divide the image data into a second predetermined number of small sections each having a second predetermined size smaller than the first predetermined size, the second predetermined number being larger than the first predetermined number, and the photographing position determining device includes a device configured to determine one or more reference positions different from each other as the photographing positions based on the focusing position distribution information of the large sections obtained by the focusing position distribution information obtaining device for the plurality of large sections, and when a number of the photographing positions determined based on the focusing position distribution information of the large sections is less than a predetermined number of the photographing positions, to additionally determine the reference position as the photographing position based on the focusing position distribution information of the small sections obtained by the focusing position distribution information obtaining device for the plurality of small sections such that the predetermined number of the determined photographing positions different from each other is obtained.

In addition, in the imaging apparatus according to an embodiment of the present invention, the photographing position determining device includes a device configured to determine the plurality of photographing positions in descending order of the number of focused sections calculated by the focusing position distribution information obtaining device.

In the imaging apparatus according to an embodiment of the present invention, the photographing position determining device includes a device configured to, when there are two or more reference positions having the same number of the focused sections calculated by the focusing position distribution information obtaining device, preferentially select and determine the reference position closer to the digital camera than the other one or more photographing positions having the same number of the focused sections as the photographing positions to continuously photograph the subject.

In the imaging apparatus according to an embodiment of the present invention, the photographing position determining device includes a device configured to determine the photographing position to continuously photograph the subject, when a number of the photographing positions determined based on the focusing positions of the plurality of sections calculated by the section focusing position calculating device based on the section focus information obtained by the section focus information obtaining device is less than the predetermined number of the photographing positions by additionally setting a photographing position with a predetermined interval based on the previously-determined photographing position.

According to the above features, specifically, the photographing positions within the predetermined number are appropriately assigned so as not to use a reference position where no subject is focused on so that it is possible to continuously obtain a plurality of appropriate photographed images having different photographing positions.

The imaging apparatus according to an embodiment of the present invention further includes an image displaying device configured to display images continuously photographed at the plurality of photographing positions determined by the photographing position determining device by the continuously-photographing processing device, and a focused frame displaying device configured to display a frame indicating the focused section having the focusing position corresponding to the photographing position of the photographed image by superimposing the frame on the photographed image by the image displaying device.

In the imaging apparatus according to an embodiment of the present invention, the focused frame displaying device includes a device configured to display the frame indicating the focused small section having the focusing position corresponding to the photographing position of the photographed image by superimposing the frame on the photographed image by the image displaying device.

In the imaging apparatus according to an embodiment of the present invention, the photographing position determining device is configured to determine the photographing position only based on the focusing position distribution information of the large sections calculated by the focusing position distribution information obtaining device.

In the imaging apparatus according to an embodiment of the present invention, when the number of the photographing positions determined by preferentially determining the reference position having the largest number of the focused large sections calculated by the focusing position distribution information obtaining device is less than the predetermined number of the photographing positions, the photographing position determining device is configured to determine the photographing positions by adding the photographing position based on the focusing position of each small section calculated by the section focusing position calculating device.

According to the above features, specifically, the photographing positions within the predetermined number are appropriately assigned so as not to use a reference position where no subject is focused on so that it is possible to continuously obtain a plurality of appropriate photographed images having different photographing positions and the focused sections of the obtained photographed images are effectively shown or grasped by a user.

An imaging apparatus according to an embodiment of the present invention includes an imaging optical system configured to image a subject image, a solid-state image pickup device configured to convert the subject image imaged by the imaging optical system into an electrical signal and output the electrical signal as image data, a photographing position determining device configured to determine a plurality of photographing positions having different focal positions of the imaging optical system from each other to continuously photograph a subject, a continuously-photographing processing device configured to obtain a plurality of photographed images by continuously photographing the subject through the solid-state image pickup device at the plurality of photographing positions determined by the photographing position determining device, an image data dividing device configured to divide the image data into a plurality of sections, a section focus information obtaining device configured to obtain section focus information about a focused state of each of the plurality of sections at a plurality of reference positions, a section focusing position calculating device configured to calculate a focusing position in which each of the plurality of sections is in the focused state based on the section focus information obtained by the section focus information obtaining device, and a focusing position distribution information obtaining device configured to calculate a number of focused sections being in the focused state at each reference position based on the focusing positions of the plurality of sections calculated by the section focusing position calculating device and obtain focusing position distribution information about a distribution of the focusing positions of the plurality of sections. The photographing position determining device includes a device configured to preferentially select and determine the reference position having the largest number of the focused sections calculated by the focusing position distribution information obtaining device as the photographing positions different from each other. The continuously-photographing processing device includes a storing device configured to store the plurality of images photographed at the plurality of photographing positions as one image file storing the plurality of image data and frame information to display a frame indicating the focused section having the focusing position corresponding to the photographing position of the photographed image.

In the imaging apparatus according an embodiment of the present invention, the continuously-photographing processing device includes a device configured to store the frame information to display the frame indicating the focused section having the focusing position corresponding to the photographing position of each photographed image in the identical image file as information accompanying the image data corresponding to the photographed image.

In the imaging apparatus according to an embodiment of the present invention, the photographing position determining device includes a device configured to determine the reference position in descending order of the number of the focused sections calculated by the focusing position distribution information obtaining device as the photographing positions.

In the imaging apparatus according to an embodiment of the present invention, the photographing position determining device includes a device configured to, when there are two or more reference positions having the same number of the focused sections calculated by the focusing position distribution information obtaining device, preferentially select and determine the reference position closer to the digital camera than the other one or more photographing positions having the same number of the focused sections as the photographing positions to continuously photograph the subject.

In the imaging apparatus according to an embodiment of the present invention, the image data dividing device includes a large section dividing device configured to divide the image data into a first predetermined number of large sections each having a first predetermined size, and a small section dividing device configured to divide the image data into a second predetermined number of small sections each having a second predetermined size smaller than the first predetermined size, the second predetermined number being larger than the first predetermined number. The photographing position determining device includes a device configured to, when the number of the photographing positions determined by preferentially determining the reference position having the largest number of the focused large sections calculated by the focusing position distribution information obtaining device is less than the predetermined number of the photographing positions, determine the photographing positions by adding the reference position based on the focusing position of each small section calculated by the focusing position distribution information obtaining device.

In the imaging apparatus according to an embodiment of the present invention, the photographing position determining device includes a device configured to determine the photographing position, when a number of the photographing positions determined based on the focusing positions of the plurality of sections calculated by the section focusing position calculating device based on the section focus information obtained by the section focus information obtaining device is less than the predetermined number of the photographing positions by additionally setting a photographing position with a predetermined interval based on the previously-determined photographing position.

According to the above features, specifically, the photographing positions within the predetermined number are appropriately assigned so as not to use a reference position where no subject is focused on so that it is possible to continuously obtain a plurality of appropriate photographed images having different photographing positions and the plurality of photographed images can be stored by accompanying information about the focused sections of the obtained photographed images.

A reproduction display apparatus according to an embodiment of the present invention, which is configured to divide one image data into a plurality of sections, to obtain section focus information about a focused state of each of the plurality of sections at a plurality of reference positions, to calculate a focusing position of each of the plurality of sections based on the section focus information, to obtain focusing position distribution information about a number of focused sections having the focusing position at each of the plurality of reference positions based on the focusing positions of the plurality of the sections, to determine photographing positions different from each other by preferentially determine the reference position having the largest number of focused sections as the photographing positions different from each other, to continuously photograph a subject at the plurality of photographing positions to obtain a plurality of photographed images, to store the plurality of photographed images as one image file storing the plurality of image data and frame information to display a frame indicating the focused section having the focusing position corresponding to the photographing position of the photographed image, and to display the image file, includes an image displaying device configured to display the photographed images based on the image data in the image file, and a focused frame displaying device configured to display the frame indicating the focused section having the focusing position corresponding to the photographing position of the photographed image by superimposing the frame on the photographed image by the image displaying device.

In the reproduction display apparatus according to an embodiment of the present invention, the plurality of sections includes a plurality of large sections each having a first predetermined size set by dividing the image data into a first predetermined number of large sections, and a plurality of small sections each having a second predetermined size smaller than the first predetermined size set by dividing the image data into a second predetermined number of small sections, the second predetermined number of small sections being larger than the first predetermined number of large sections. The focused frame displaying device includes a device configured to display the frame indicating the focused small section having the focusing position corresponding to the photographing position of the photographed image by superimposing the frame on the photographed image by the image displaying device.

According to the above features, specifically, it is possible to continuously obtain a plurality of photographed images having different photographing positions and to display the plurality of photographed images stored by accompanying information about the focused sections of the obtained photographed images so that the focused sections of the photographed images can be effectively and more accurately shown or grasped by a user.

An image recording method according to an embodiment of the present invention in an imaging apparatus including an imaging optical system configured to image a subject image, a solid-state image pickup device configured to convert the subject image imaged by the imaging optical system into an electrical signal and output the electrical signal as image data, a photographing position determining device configured to determine a plurality of photographing positions having different focal positions of the imaging optical system to continuously photograph a subject, and a continuously-photographing processing device configured to obtain a plurality of photographed images by continuously photographing the subject through the solid-state image pickup device at the plurality of photographing positions determined by the photographing position determining device, includes the steps of: dividing the image data into a plurality of sections, obtaining section focus information about a focused state of each of the plurality of sections at a plurality of reference positions, calculating a focusing position in which each of the plurality of sections is in the focused state based on the obtained section focus information, calculating a number of focused sections being in the focused state at each reference position based on the calculated focusing positions of the plurality of sections and obtaining focusing position distribution information about a distribution of the focusing positions of the plurality of sections, preferentially determining the reference position having the largest calculated number of focused sections as the photographing positions different from each other, continuously photographing the subject at the plurality of determined photographing positions to obtain a plurality of image data as the plurality of photographed image, and storing the plurality of images photographed at the plurality of photographing positions as one image file storing the plurality of image data and frame information to display a frame indicating the focused section having the focusing position corresponding to the photographing position of the photographed image.

The image recording method according to an embodiment of the present invention, further includes storing the frame information to display the frame indicating the focused section having the focusing position corresponding to the photographing position of each photographed image in the identical image file as information accompanying the image data corresponding to the photographed image in the storing step of the plurality of photographed images.

The image recording method according to an embodiment of the present invention, further includes determining the plurality of photographing positions in descending order of the calculated number of focused sections in the determining step.

In the image recording method according to an embodiment of the present invention, the photographing position determining step includes, when there are two or more reference positions having the same calculated number of the focused sections, preferentially selecting and determining the reference position closer to the digital camera than the other one or more photographing positions having the same number of the focused sections as the photographing positions to continuously photograph the subject.

In the image recording method according to an embodiment of the present invention, the image data dividing step includes dividing the image data into a first predetermined number of large sections each having a first predetermined size, and dividing the image data into a second predetermined number of small sections each having a second predetermined size smaller than the first predetermined size, the second predetermined number being larger than the first predetermined number. The photographing position determining step includes, when the number of the photographing positions determined by preferentially determining the reference position having the calculated largest number of focused large sections is less than a predetermined number of the photographing positions, preferentially additionally determining the reference position having the calculated largest number of focused small sections as the photographing position based on the focusing position distribution information of the small sections to determine the plurality of photographing positions to continuously photograph the subject.

In the image recording method according to an embodiment of the present invention, the photographing position determining step includes determining the photographing position to continuously photograph the subject, when the number of the photographing positions determined based on the calculated focusing positions of the plurality of sections based on the section focus information is less than the predetermined number of the photographing positions, by additionally setting a photographing position with a predetermined interval based on the previously-determined photographing position.

According to the above features, specifically, the photographing positions within the predetermined number are appropriately assigned so as not to use a reference position where no subject is focused on so that it is possible to continuously obtain a plurality of appropriate photographed images having different photographing positions and the photographed images can be stored with the focused sections of the obtained photographed images.

A reproduction displaying method according to an embodiment of the present invention includes the steps of dividing one image data into a plurality of sections, obtaining section focus information about a focused state of each of the plurality of sections at a plurality of reference positions, calculating a focusing position in which each of the plurality of sections is in the focused state based on the obtained section focus information, calculating a number of focused sections being in the focused state at each reference position based on the calculated focusing positions of the plurality of sections and obtaining focusing position distribution information about a distribution of the focusing positions of the plurality of sections, preferentially determining the reference position having the largest calculated number of focused sections as the photographing positions different from each other, continuously photographing the subject at the plurality of determined photographing positions to obtain a plurality of image data as the plurality of photographed image, displaying the image file as the plurality of photographed images as one image file storing a plurality of image data and frame information about a frame of the focused section having the focusing position corresponding to the photographing position of the photographed image, displaying the photographed image based on the image data in the image file, and displaying a frame indicating the focused section having the focusing position corresponding to the photographing position of the photographed image by superimposing the frame on the photographed image based on the frame information.

In the reproduction displaying apparatus according to an embodiment of the present invention, the dividing step of the image data includes dividing the image data into a first predetermined number of large sections each having a first predetermined size, and dividing the image data into a second predetermined number of small sections each having a second predetermined size smaller than the first predetermined size, the second predetermined number being larger than the first predetermined number and displaying the frame indicating the small section having the focusing position corresponding to the photographing position of the photographed image by superimposing the frame on the photographed image.

According to the above features, specifically, it is possible to continuously obtain a plurality of photographed images having different photographing positions and to display the photographed images stored with information about the focused sections of the obtained photographed images so that the focused sections can be effectively shown or grasped by a user.

Although the present invention has been described in terms of exemplary embodiments, it is not limited thereto. It should be appreciated that variations may be made in the embodiments described by persons skilled in the art without departing from the scope of the present invention as defined by the following claims.

CROSS REFERENCE TO RELATED APPLICATIONS

The present application is based on and claims priority from Japanese Application Number 2009-049991, filed on Mar. 3, 2009, the disclosure of which is hereby incorporated by reference herein in its entirety.

The invention claimed is:

1. An imaging apparatus, comprising
an imaging optical system configured to image a subject image;
a solid-state image pickup device configured to convert the subject image imaged by the imaging optical system into an electrical signal and output the electrical signal as image data;
a photographing position determining device configured to determine a plurality of photographing positions having different focal positions of the imaging optical system to continuously photograph a subject;
a continuously-photographing processing device configured to obtain a plurality of photographed images by continuously photographing the subject through the solid-state image pickup device at the plurality of photographing positions determined by the photographing position determining device;
an image data dividing device configured to divide the image data into a plurality of sections;
a section focus information obtaining device configured to obtain section focus information about a focused state of each of the plurality of sections at a plurality of reference positions;
a section focusing position calculating device configured to calculate a focusing position in which each of the plurality of sections is in the focused state based on the section focus information obtained by the section focus information obtaining device; and
a focusing position distribution information obtaining device configured to calculate a number of focused sections each being in the focused state at each reference position based on the focusing positions of the plurality of sections calculated by the section focusing position calculating device and obtain focusing position distribution information,
wherein the image data dividing device includes
a large section dividing device configured to divide the image data into a first predetermined number of large sections each having a first predetermined size, and
a small section dividing device configured to divide the image data into a second predetermined number of small sections each having a second predetermined size smaller than the first predetermined size, the second predetermined number being larger than the first predetermined number; and
the photographing position determining device includes
a device configured to determine one or more reference positions different from each other as the photographing positions based on the focusing position distribution information of the large sections obtained by the focusing position distribution information obtaining device for the plurality of large sections, and when a number of the photographing positions determined based on the focusing position distribution information of the large sections is less than a predetermined number of the photographing positions, to additionally determine the reference position as the photographing position based on the focusing position distribution information of the small sections obtained by the focusing position distribution information obtaining device for the plurality of small sections such that the predetermined number of the determined photographing positions different from each other is obtained.

2. The imaging apparatus according to claim 1, wherein the photographing position determining device includes
a device configured to determine the plurality of photographing positions in descending order of the number of focused sections calculated by the focusing position distribution information obtaining device.

3. The imaging apparatus according to claim 1, wherein the photographing position determining device includes
a device configured to, when there are two or more reference positions having the same number of the focused sections calculated by the focusing position distribution information obtaining device, preferentially select and determine the reference position closer to the imaging apparatus than the other one or more photographing positions having the same number of the focused sections as the photographing positions to continuously photograph the subject.

4. The imaging apparatus according to claim 1, wherein the photographing position determining device includes
a device configured to determine the photographing position to continuously photograph the subject, when a number of the photographing positions determined based on the focusing positions of the plurality of sections calculated by the section focusing position calculating device based on the section focus information obtained by the section focus information obtaining device is less than the predetermined number of the photographing positions by additionally setting a photographing position with a predetermined interval based on the previously-determined photographing position.

5. The imaging apparatus according to claim 1, further comprising:
- an image displaying device configured to display images continuously photographed at the plurality of photographing positions determined by the photographing position determining device by the continuously-photographing processing device; and
- a focused frame displaying device configured to display a frame indicating the focused section having the focusing position corresponding to the photographing position of the photographed image by superimposing the frame on the photographed image by the image displaying device.

6. The imaging apparatus according to claim 5, wherein the focused frame displaying device includes
- a device configured to display the frame indicating the focused small section having the focusing position corresponding to the photographing position of the photographed image by superimposing the frame on the photographed image by the image displaying device.

7. The imaging apparatus according to claim 6, wherein the photographing position determining device is configured to determine the photographing position only based on the focusing position distribution information of the large sections calculated by the focusing position distribution information obtaining device.

8. The imaging apparatus according to claim 6, wherein when the number of the photographing positions determined by preferentially determining the reference position having the largest number of the focused large sections calculated by the focusing position distribution information obtaining device is less than the predetermined number of the photographing positions, the photographing position determining device is configured to determine the photographing positions by adding the photographing position based on the focusing position of each small section calculated by the section focusing position calculating device.

9. An imaging apparatus, comprising
- an imaging optical system configured to image a subject image;
- a solid-state image pickup device configured to convert the subject image imaged by the imaging optical system into an electrical signal and output the electrical signal as image data;
- a photographing position determining device configured to determine a plurality of photographing positions having different focal positions of the imaging optical system from each other to continuously photograph a subject;
- a continuously-photographing processing device configured to obtain a plurality of photographed images by continuously photographing the subject through the solid-state image pickup device at the plurality of photographing positions determined by the photographing position determining device;
- an image data dividing device configured to divide the image data into a plurality of sections;
- a section focus information obtaining device configured to obtain section focus information about a focused state of each of the plurality of sections at a plurality of reference positions;
- a section focusing position calculating device configured to calculate a focusing position in which each of the plurality of sections is in the focused state based on the section focus information obtained by the section focus information obtaining device; and
- a focusing position distribution information obtaining device configured to calculate a number of focused sections being in the focused state at each reference position based on the focusing positions of the plurality of sections calculated by the section focusing position calculating device and obtain focusing position distribution information about a distribution of the focusing positions of the plurality of sections,
- wherein the photographing position determining device includes
  - a device configured to preferentially select and determine the reference position having the largest number of the focused sections calculated by the focusing position distribution information obtaining device as the photographing positions different from each other; and
- the continuously-photographing processing device includes
  - a storing device configured to store the plurality of images photographed at the plurality of photographing positions as one image file storing the plurality of image data and frame information to display a frame indicating the focused section having the focusing position corresponding to the photographing position of the photographed image.

10. The imaging apparatus according to claim 9, wherein the continuously-photographing processing device includes
- a device configured to store the frame information to display the frame indicating the focused section having the focusing position corresponding to the photographing position of each photographed image in the identical image file as information accompanying the image data corresponding to the photographed image.

11. An image recording method in an imaging apparatus including
- an imaging optical system configured to image a subject image;
- a solid-state image pickup device configured to convert the subject image imaged by the imaging optical system into an electrical signal and output the electrical signal as image data;
- a photographing position determining device configured to determine a plurality of photographing positions having different focal positions of the imaging optical system to continuously photograph a subject; and
- a continuously-photographing processing device configured to obtain a plurality of photographed images by continuously photographing the subject through the solid-state image pickup device at the plurality of photographing positions determined by the photographing position determining device, comprising the steps of:
- dividing the image data into a plurality of sections;
- obtaining section focus information about a focused state of each of the plurality of sections at a plurality of reference positions;
- calculating a focusing position in which each of the plurality of sections is in the focused state based on the obtained section focus information;
- calculating a number of focused sections being in the focused state at each reference position based on the calculated focusing positions of the plurality of sections and obtaining focusing position distribution information about a distribution of the focusing positions of the plurality of sections;
- preferentially determining the reference position having the largest calculated number of focused sections as the photographing positions different from each other;

continuously photographing the subject at the plurality of determined photographing positions to obtain a plurality of image data as the plurality of photographed image; and storing the plurality of images photographed at the plurality of photographing positions as one image file storing the plurality of image data and frame information to display a frame indicating the focused section having the focusing position corresponding to the photographing position of the photographed image.

12. The image recording method according to claim 11, further comprising:

storing the frame information to display the frame indicating the focused section having the focusing position corresponding to the photographing position of each photographed image in the identical image file as information accompanying the image data corresponding to the photographed image in the storing step of the plurality of photographed images.

13. The image recording method according to claim 11, further comprising:

determining the plurality of photographing positions in descending order of the calculated number of focused sections in the determining step.

14. The image recording method according to claim 11, wherein the photographing position determining step includes, when there are two or more reference positions having the same calculated number of the focused sections, preferentially selecting and determining the reference position closer to the imaging apparatus than the other one or more photographing positions having the same number of the focused sections as the photographing positions to continuously photograph the subject.

15. The image recording method according to claim 11, wherein the image data dividing step includes:

dividing the image data into a first predetermined number of large sections each having a first predetermined size; and dividing the image data into a second predetermined number of small sections each having a second predetermined size smaller than the first predetermined size, the second predetermined number being larger than the first predetermined number, and the photographing position determining step includes, when the number of the photographing positions determined by preferentially determining the reference position having the calculated largest number of focused large sections is less than a predetermined number of the photographing positions, preferentially additionally determining the reference position having the calculated largest number of focused small sections as the photographing position based on the focusing position distribution information of the small sections to determine the plurality of photographing positions to continuously photograph the subject.

16. The image recording method according to claim 11, wherein the photographing position determining step includes:

determining the photographing position to continuously photograph the subject, when the number of the photographing positions determined based on the calculated focusing positions of the plurality of sections based on the section focus information is less than the predetermined number of the photographing positions, by additionally setting a photographing position with a predetermined interval based on the previously-determined photographing position.

17. A reproduction displaying method, comprising the steps of:

the image recording method according to claim 11;

displaying the image file as the plurality of photographed images as one image file storing a plurality of image data and frame information about a frame of the focused section having the focusing position corresponding to the photographing position of the photographed image;

displaying the photographed image based on the image data in the image file; and displaying a frame indicating the focused section having the focusing position corresponding to the photographing position of the photographed image by superimposing the frame on the photographed image based on the frame information.

18. The reproduction displaying method according to claim 17, wherein the dividing step of the image data includes dividing the image data into a first predetermined number of large sections each having a first predetermined size, and dividing the image data into a second predetermined number of small sections each having a second predetermined size smaller than the first predetermined size, the second predetermined number being larger than the first predetermined number; and displaying the frame indicating the small section having the focusing position corresponding to the photographing position of the photographed image by superimposing the frame on the photographed image.

* * * * *